US011940748B2

(12) United States Patent
Furuichi

(10) Patent No.: US 11,940,748 B2
(45) Date of Patent: Mar. 26, 2024

(54) HEATING DEVICE INCLUDING A PLURALITY OF PAD POSITIONING PORTIONS AND IMAGE FORMING APPARATUS INCORPORATING THE HEATING DEVICE

(71) Applicant: Yuusuke Furuichi, Kanagawa (JP)

(72) Inventor: Yuusuke Furuichi, Kanagawa (JP)

(73) Assignee: RICOH COMPANY LTD., Tokyo (JP)

( * ) Notice: Subject to any disclaimer, the term of this patent is extended or adjusted under 35 U.S.C. 154(b) by 0 days.

(21) Appl. No.: 17/716,457

(22) Filed: Apr. 8, 2022

(65) Prior Publication Data

US 2022/0357697 A1 Nov. 10, 2022

(30) Foreign Application Priority Data

May 7, 2021 (JP) ................................ 2021-079028

(51) Int. Cl.
*G03G 15/20* (2006.01)

(52) U.S. Cl.
CPC ................................ *G03G 15/2053* (2013.01)

(58) Field of Classification Search
CPC .................. G03G 15/2053; G03G 2215/2035
See application file for complete search history.

(56) References Cited

U.S. PATENT DOCUMENTS

| | | | |
|---|---|---|---|
| 7,235,761 B1 | 6/2007 | Maul et al. | |
| 2016/0098001 A1 | 4/2016 | Ogawa et al. | |
| 2019/0179242 A1 | 6/2019 | Adachi et al. | |
| 2019/0278206 A1 | 9/2019 | Adachi et al. | |
| 2019/0286026 A1 | 9/2019 | Furuichi et al. | |
| 2019/0286027 A1 | 9/2019 | Someya et al. | |
| 2019/0286028 A1 | 9/2019 | Furuichi et al. | |
| 2019/0302664 A1* | 10/2019 | Morihara ........... | G03G 15/2053 |
| 2020/0033768 A1 | 1/2020 | Furuichi et al. | |
| 2020/0033771 A1 | 1/2020 | Furuichi et al. | |
| 2020/0033776 A1 | 1/2020 | Yoshinaga et al. | |
| 2020/0103796 A1 | 4/2020 | Furuichi et al. | |
| 2020/0103797 A1 | 4/2020 | Furuichi | |

(Continued)

FOREIGN PATENT DOCUMENTS

| | | | |
|---|---|---|---|
| EP | 3751353 A1 | 12/2020 | |
| JP | 2002-072719 | 3/2002 | |

(Continued)

OTHER PUBLICATIONS

Extended European Search Report dated Aug. 4, 2022 issued in corresponding European Appln. No. 22167755.2.

*Primary Examiner* — Arlene Heredia
(74) *Attorney, Agent, or Firm* — Harness, Dickey & Pierce, P.L.C.

(57) ABSTRACT

A heating device includes a belt, an opposed rotator, a heater, a nip formation pad inside the belt, a holder holding the nip formation pad, a stay supporting the holder. The nip formation pad or the holder includes pad positioning portions and a holder positioning portion. The pad positioning portions includes a first and second pad positioning portions at both ends of the nip formation pad or the holder with respect to a center of the heater, and a third pad positioning portion near the center. The holder positioning portion is nearer to the center than the first or the second pad positioning portion.

19 Claims, 15 Drawing Sheets

(56) References Cited

U.S. PATENT DOCUMENTS

| | | | | |
|---|---|---|---|---|
| 2020/0103803 | A1 | 4/2020 | Furuichi | |
| 2020/0103814 | A1 | 4/2020 | Someya et al. | |
| 2020/0117124 | A1 | 4/2020 | Furuichi | |
| 2020/0117125 | A1 | 4/2020 | Furuichi | |
| 2020/0174407 | A1 | 6/2020 | Furuichi | |
| 2020/0174408 | A1 | 6/2020 | Furuichi et al. | |
| 2020/0183307 | A1 | 6/2020 | Furuichi et al. | |
| 2020/0249601 | A1 | 8/2020 | Inoue et al. | |
| 2020/0249604 | A1* | 8/2020 | Adachi | G03G 15/2053 |
| 2020/0292972 | A1 | 9/2020 | Inoue et al. | |
| 2020/0387096 | A1* | 12/2020 | Adachi | G03G 15/80 |
| 2021/0278790 | A1 | 9/2021 | Furuichi et al. | |

FOREIGN PATENT DOCUMENTS

| | | |
|---|---|---|
| JP | 2016-153856 | 8/2016 |
| JP | 2017-009894 | 1/2017 |
| JP | 2020-052345 | 4/2020 |

* cited by examiner

HEATING DEVICE INCLUDING A PLURALITY OF PAD POSITIONING PORTIONS AND IMAGE FORMING APPARATUS INCORPORATING THE HEATING DEVICE

CROSS-REFERENCE TO RELATED APPLICATION

This patent application is based on and claims priority pursuant to 35 U.S.C. § 119(a) to Japanese Patent Application No. 2021-079028, filed on May 7, 2021, in the Japan Patent Office, the entire disclosure of which is hereby incorporated by reference herein.

BACKGROUND

Technical Field

Embodiments of the present disclosure generally relate to a heating device and an image forming apparatus.

Related Art

A fixing device as a heating device includes a fixing belt, a pressure roller as an opposed member, and a nip formation pad. The nip formation pad is disposed inside a loop of the fixing belt and contacts the pressure roller via the fixing belt to form a fixing nip between the fixing belt and the pressure roller. One side of the nip formation pad is in contact with the fixing belt, and the other opposite side of the nip formation pad is held by a holder.

SUMMARY

This specification describes an improved heating device that includes a belt, an opposed rotator opposite the belt, a heater, a nip formation pad disposed inside a loop of the belt to form a nip between the belt and the opposed rotator, a holder holding the nip formation pad, a stay supporting the holder. A plurality of pad positioning portions is disposed on at least one of the nip formation pad or the holder to position the nip formation pad with respect to the holder in a rotation direction of the belt. The plurality of nip formation pad includes a first pad positioning portion, a second pad positioning portion, and a third pad positioning portion. The first pad positioning portion is disposed at one end of the at least one of the nip formation pad or the holder with respect to a center position of a heat generation span of the heater in a longitudinal direction of the heater. The second pad positioning portion is disposed at the other end of the at least one of the nip formation pad or the holder with respect to a center position of a heat generation span of the heater in the longitudinal direction of the heater. The third pad positioning portion is disposed nearer to the center position than each of the first pad positioning portion and the second pad positioning portion. A holder positioning portion is included by at least one of the holder or the stay to position the holder with respect to the stay in the rotation direction of the belt. The holder positioning portion is disposed nearer to the center position than at least one of the first pad positioning portion or the second pad positioning portion.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5 is a perspective view of a heater unit including a heater and the like;

Figure 1:
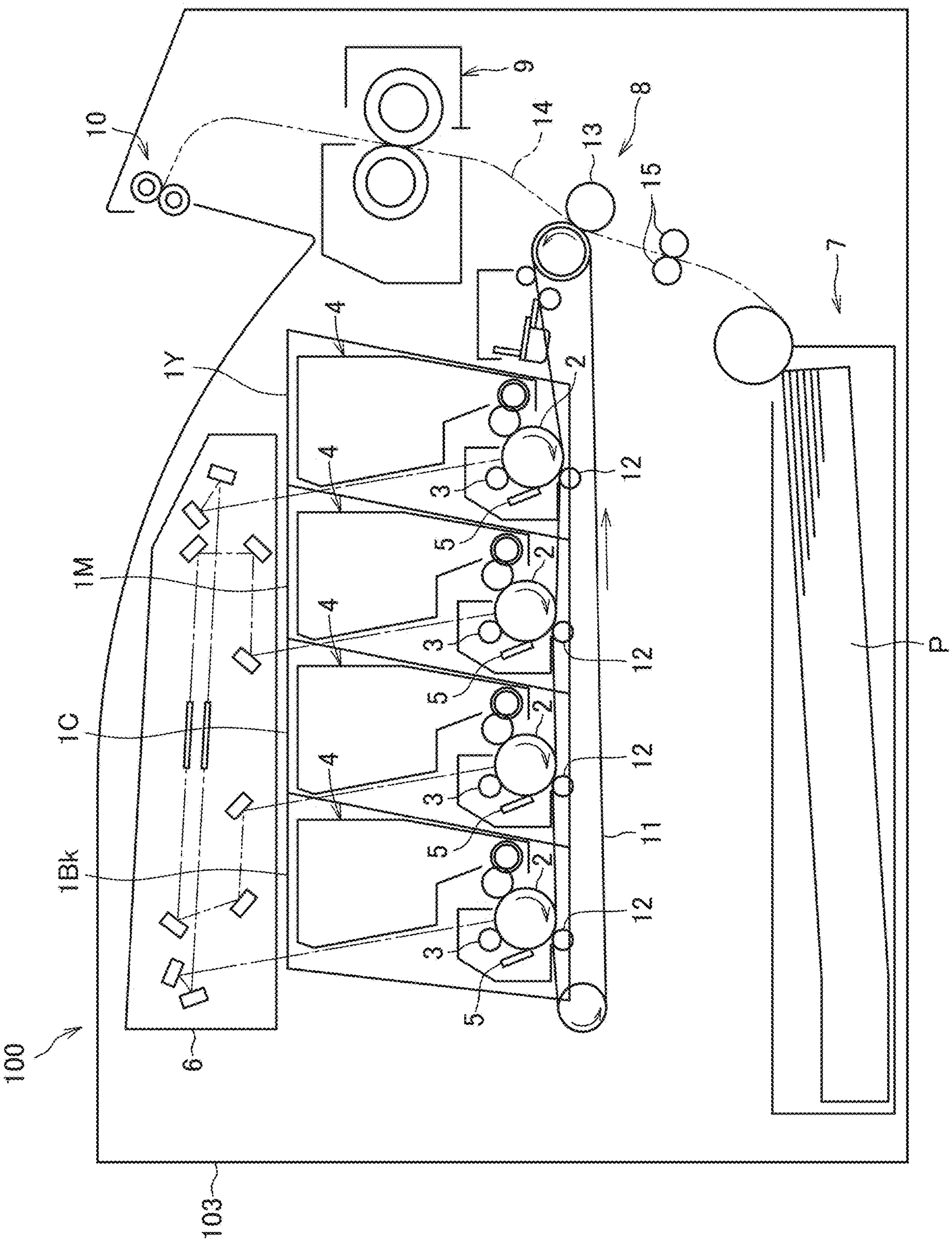
FIG. 1 is a schematic diagram illustrating a configuration of an image forming apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise. Identical reference numerals are assigned to identical components or equivalents and a description of those components is simplified or omitted. Hereinafter, a fixing device incorporated in an image forming apparatus is described as a heating device according to an embodiment of the present disclosure.

FIG. 1 is a schematic diagram illustrating a configuration of an image forming apparatus according to an embodiment of the present disclosure.

The image forming apparatus 100 illustrated in FIG. 1 includes four image forming units 1Y, 1M, 1C, and 1Bk detachably attached to an image forming apparatus body 103. The image forming units 1Y, 1M, 1C, and 1Bk have the same configuration except for containing different color developers, i.e., yellow (Y), magenta (M), cyan (C), and black (Bk) toners, respectively. The colors of the developers correspond to decomposed color separation components of full-color images. Each of the image forming units 1Y, 1M, 1C, and 1Bk includes a drum-shaped photoconductor 2 as an image bearer, a charging device 3, a developing device 4, and a cleaning device 5. The charging device 3 charges the surface of the photoconductor 2. The developing device 4 supplies the toner as the developer to the surface of the photoconductor 2 to form a toner image. The cleaning device 5 cleans the surface of the photoconductor 2.

The image forming apparatus 100 includes an exposure device 6, a sheet feeder 7, a transfer device 8, a fixing device 9, and a sheet ejection device 10. The exposure device 6 exposes the surface of the photoconductor 2 to form an electrostatic latent image on the surface of the photoconductor 2. The sheet feeder 7 supplies a sheet P as a recording medium to a sheet conveyance path 14. The transfer device 8 transfers the toner images formed on the photoconductors 2 onto the sheet P. The fixing device 9 fixes the toner image transferred onto the sheet P to the surface of the sheet P. The sheet ejection device 10 ejects the sheet P outside the image forming apparatus 100. The image forming units 1Y, 1M, 1C, and 1Bk including photoconductors 2 and the charging devices 3, the exposure devices 6, the transfer device 8, and the like configures an image forming device that forms an image on the sheet P.

The transfer device 8 includes an intermediate transfer belt 11 having an endless form and serving as an intermediate transferor, four primary transfer rollers 12 serving as primary transferors, a secondary transfer roller 13 serving as a secondary transferor. The intermediate transfer belt 11 is stretched by a plurality of rollers. Each of the four primary transfer rollers 12 transfers the toner image on each of the photoconductors 2 onto the intermediate transfer belt 11. The secondary transfer roller 13 transfers the toner image transferred onto the intermediate transfer belt 11 onto the sheet P. The four primary transfer rollers 12 are in contact with the respective photoconductors 2 via the intermediate transfer belt 11. Thus, the intermediate transfer belt 11 contacts each of the photoconductors 2, forming a primary transfer nip therebetween. On the other hand, the secondary transfer roller 13 contacts, via the intermediate transfer belt 11, one of the plurality of rollers around which the intermediate transfer belt 11 is stretched. Thus, the secondary transfer nip is formed between the secondary transfer roller 13 and the intermediate transfer belt 11.

A timing roller pair 15 is disposed between the sheet feeder 7 and the secondary transfer nip defined by the secondary transfer roller 13 in the sheet conveyance path 14.

Next, a description is given of a series of print operations of the image forming apparatus 100 with reference to FIG. 1.

When the image forming apparatus 100 receives an instruction to start printing, a driver drives and rotates the photoconductor 2 clockwise in FIG. 1 in each of the image forming units 1Y, 1M, 1C, and 1Bk. The charging device 3 charges the surface of the photoconductor 2 uniformly at a high electric potential. Next, the exposure device 6 exposes the surface of each photoconductor 2 based on image data of the document read by the document reading device or print data instructed to be printed from the terminal. As a result, the potential of the exposed portion on the surface of each photoconductor 2 decreases, and an electrostatic latent image is formed on the surface of each photoconductor 2. The developing device 4 supplies toner to the electrostatic latent image formed on the photoconductor 2, forming a toner image thereon.

The toner image formed on each of the photoconductors 2 reaches the primary transfer nip at each of the primary transfer rollers 12 in accordance with rotation of each of the photoconductors 2. The toner images are sequentially transferred and superimposed onto the intermediate transfer belt 11 that is driven to rotate counterclockwise in FIG. 1 to form a full color toner image. Thereafter, the full color toner image formed on the intermediate transfer belt 11 is conveyed to the secondary transfer nip defined by the secondary transfer roller 13 in accordance with rotation of the intermediate transfer belt 11. The full color toner image is transferred onto the sheet P conveyed to the secondary transfer nip. The sheet P is supplied from the sheet feeder 7. The timing roller pair 15 temporarily halts the sheet P supplied from the sheet feeder 7. Thereafter, the timing roller pair 15 conveys the sheet P to the secondary transfer nip at a time when the full color toner image formed on the intermediate transfer belt 11 reaches the secondary transfer nip. Thus, the full color toner image is transferred onto and borne on the sheet P. After the toner image is transferred from each of the photoconductors 2 onto the intermediate transfer belt 11, each of the cleaning devices 5 removes residual toner on each of the photoconductors 2.

After the full color toner image is transferred onto the sheet P, the sheet P is conveyed to the fixing device 9 to fix the toner image on the sheet P. Subsequently, the sheet ejection device 10 ejects the sheet P outside the image forming apparatus 100, and the series of print operations are completed.

Next, a configuration of the fixing device 9 is described.

Figure 2:
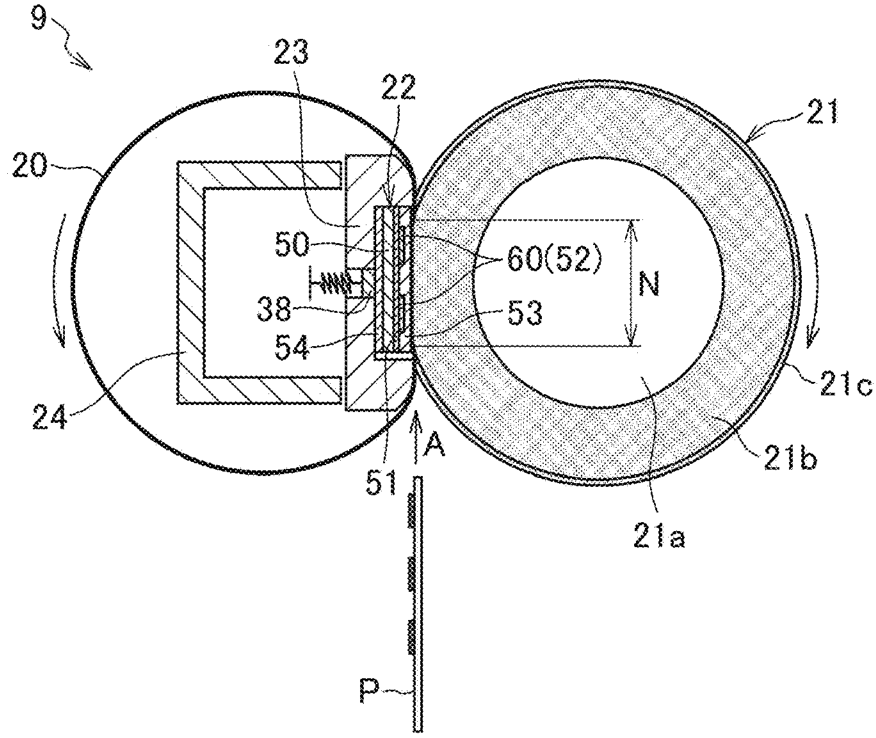
FIG. 2 is a schematic cross-sectional view of a main part of a fixing device incorporated in the image forming apparatus of FIG. 1.

As illustrated in FIG. 2, the fixing device 9 according to the present embodiment includes a fixing belt 20 as a fixing member, a pressure roller 21 as an opposed rotator or a pressure rotator, a planar heater 22 as a nip formation pad, a heater holder 23 as a holder, a stay 24 as a support, a thermistor 38 as a temperature detector. The fixing belt 20 is an endless belt. The pressure roller 21 contacts the outer circumferential surface of the fixing belt 20 to form a fixing nip N as a nip. The heater holder 23 holds the heater 22. The stay 24 supports a back side of the heater holder 23 extending in a longitudinal direction. The thermistor 38 is in contact with the back side of the heater 22 and detects the temperature of the heater 22. The fixing device 9, the fixing belt 20, the pressure roller 21, the heater 22, the heater holder 23, and the stay 24 extend in a direction perpendicular to the sheet surface of FIG. 2 and a direction indicated by two-headed arrow in FIG. 3. Hereinafter, the direction is simply referred to as the longitudinal direction. Note that the longitudinal direction is also a width direction of the sheet P conveyed, a belt width direction of the fixing belt 20, and an axial direction of the pressure roller 21.

The fixing belt 20 includes, for example, a tubular base (a base layer) made of polyimide (PI), and the tubular base has an outer diameter of 25 mm and a thickness of from 40 to 120 μm. The fixing belt 20 further includes a release layer serving as an outermost surface layer. The release layer is made of fluororesin, such as tetrafluoroethylene-perfluoroalkylvinylether copolymer (PFA) or polytetrafluoroethylene (PTFE) and has a thickness in a range of from 5 μm to 50 μm to enhance durability of the fixing belt 20 and facilitate separation of the sheet P and a foreign substance from the fixing belt 20. An elastic layer made of rubber having a thickness of from 50 to 500 μm may be interposed between the base and the release layer. The base of the fixing belt 20 may be made of heat resistant resin such as polyetheretherketone (PEEK) or metal such as nickel (Ni) and steel use stainless (SUS), instead of polyimide. The inner circumferential surface of the fixing belt 20 may be coated with polyimide or polytetrafluoroethylene (PTFE) as a slide layer.

The pressure roller 21 having, for example, an outer diameter of 25 mm, includes a solid iron cored bar 21*a*, an elastic layer 21*b* on the surface of the cored bar 21*a*, and a release layer 21*c* formed on the outside of the elastic layer 21*b*. The elastic layer 21*b* is made of silicone rubber and has a thickness of 3.5 mm, for example. Preferably, the release layer 21*c* is formed by a fluororesin layer having, for example, a thickness of approximately 40 μm on the surface of the elastic layer 21*b* to facilitate separation of the sheet P and a foreign substance from the pressure roller 21.

The heater 22 is disposed to contact the inner circumferential surface of the fixing belt 20. The heater 22 in the present embodiment contacts the pressure roller 21 via the fixing belt 20 and serves as a nip formation pad to form the fixing nip N between the pressure roller 21 and the fixing belt 20. In other words, a heater and the nip formation pad is configured as a single component, the heater 22 in the present embodiment. The fixing belt is a heated member heated by the heater 22.

The heater 22 may not contact the fixing belt 20 or may contact the fixing belt 20 indirectly via, e.g., a low friction sheet. When the heater 22 is brought into direct contact with the fixing belt 20, the efficiency of heat transfer to the fixing belt 20 is improved.

The heater 22 includes a base 50, a first insulation layer 51 layered on one side of the base 50, a conductor layer 52 that includes a resistive heat generator 60 and is layered on the first insulation layer 51, a second insulation layer 53 that is layered on the conductor layer 52 and is in contact with the fixing belt 20 forming the fixing nip N, and a third insulation layer 54 layered on the other side of the base 50.

The heater holder 23 and the stay 24 are disposed inside a loop of the fixing belt 20. The stay 24 is configured by a channeled metallic member, and both side plates of the fixing device 9 support both end portions of the stay 24. The stay 24 supports a stay side face of the heater holder 23, that faces the stay 24 and is opposite a heater side face of the heater holder 23, that faces the heater 22. Accordingly, the stay 24 retains the heater 22 and the heater holder 23 to be immune from being bent substantially by pressure from the pressure roller 21, stably forming the fixing nip N between the fixing belt 20 and the pressure roller 21.

When the stay 24 supports the heater holder 23, a surface of the heater holder 23 opposite the pressure roller 21 that is a left surface of the heater holder 23 in FIG. 2 contacts the stay 24 having a portion extending in the pressing direction of the pressure roller 21 (the lateral direction in FIG. 2) or a certain thick portion. Such a configuration reduces a bend of the heater holder 23 caused by the pressing force from the pressure roller 21, in particular, the bend in the longitudinal direction of the heater holder 23 in the present embodiment. However, the above-described contact includes not only the case where the stay 24 is in direct contact with the heater holder 23 but also the case where the stay 24 contacts the heater holder 23 via another member. Even in such cases, the stay 24 can reduce bending of the heater holder 23 under pressure from the pressure roller 21.

Since the heater holder 23 is subject to temperature increase by heat from the heater 22, the heater holder 23 is preferably made of a heat resistant material. The heater holder 23 made of heat-resistant resin having low thermal conduction, such as a liquid crystal polymer (LCP) or polyether ether ketone (PEEK), reduces heat transfer from the heater 22 to the heater holder 23. Thus, the heater 22 can effectively heat the fixing belt 20.

A spring serving as a biasing member causes the fixing belt 20 and the pressure roller 21 to press against each other. Thus, the fixing nip N is formed between the fixing belt 20 and the pressure roller 21. As a driving force is transmitted to the pressure roller 21 from a driver disposed in the image forming apparatus body 103 (see FIG. 1), the pressure roller 21 serves as a drive roller that drives and rotates the fixing belt 20. The fixing belt 20 is thus driven and rotated by the pressure roller 21 as the pressure roller 21 rotates. When the fixing belt 20 rotates, the fixing belt 20 slides on the heater 22. In order to facilitate sliding performance of the fixing belt 20, a lubricant such as oil or grease may be interposed between the heater 22 and the fixing belt 20.

When printing starts, the driver drives and rotates the pressure roller 21 and the fixing belt 20 starts rotation in accordance with rotation of the pressure roller 21. Additionally, as power is supplied to the heater 22, the heater 22 heats the fixing belt 20. When the temperature of the fixing belt 20 reaches a predetermined target temperature called a fixing temperature, as illustrated in FIG. 2, the sheet P bearing an unfixed toner image is conveyed in a direction indicated by arrow A in FIG. 2 (a sheet conveyance direction) and enters the fixing nip N between the fixing belt 20 and the pressure roller 21. Thus, the unfixed toner image on the sheet P is heated and pressed onto the sheet P and fixed thereon in the fixing nip N.

Figure 3:
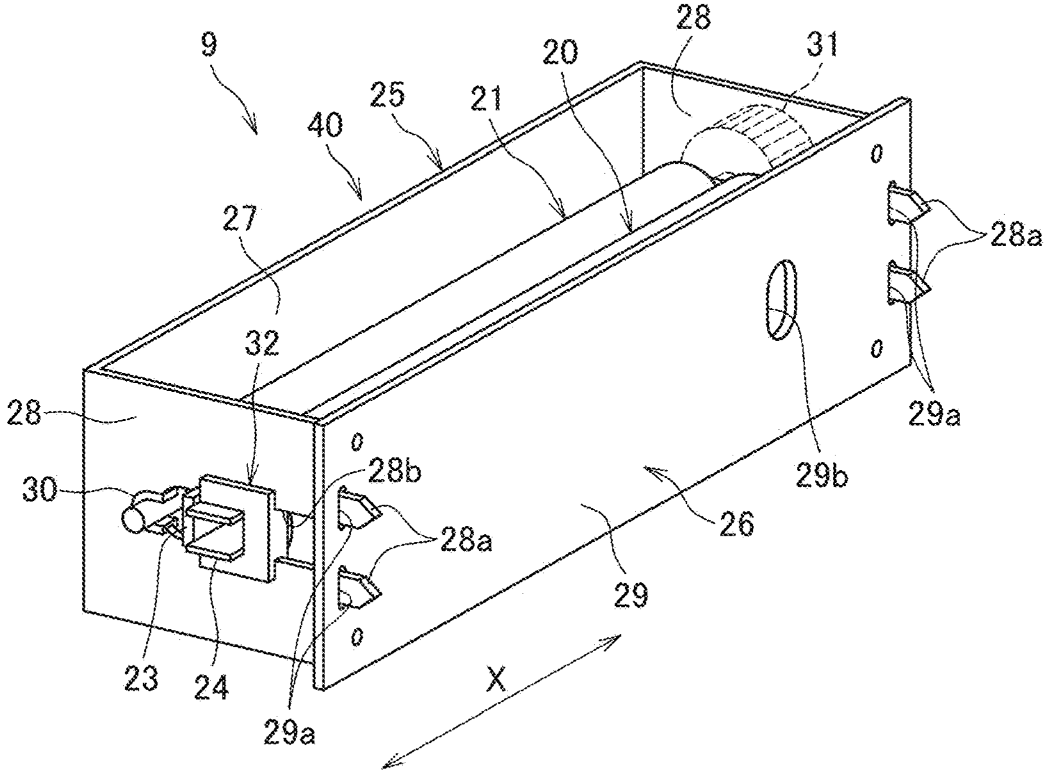
FIG. 3 is a perspective view of the fixing device of FIG. 2.
Figure 4:
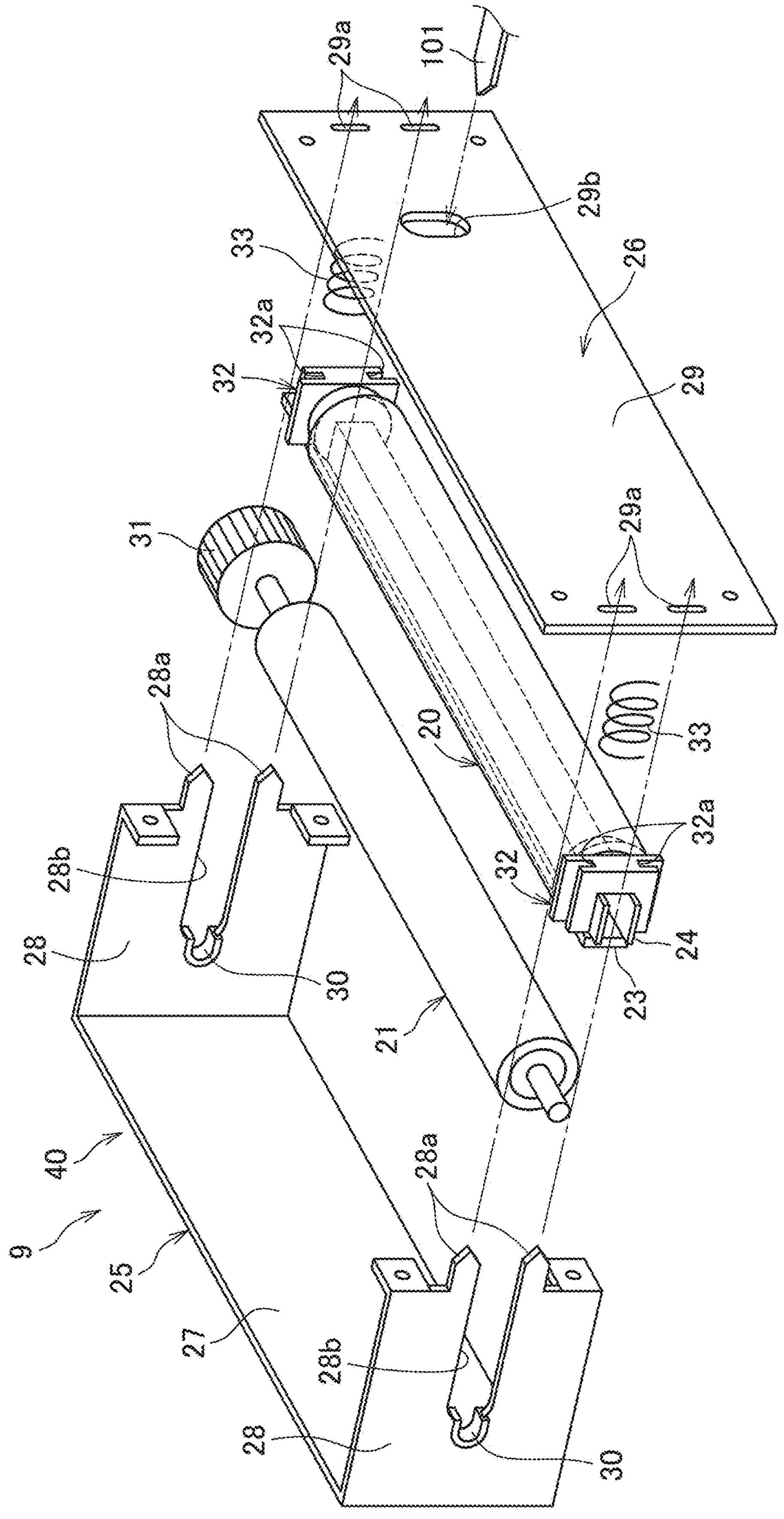
FIG. 4 is an exploded perspective view of the fixing device of FIG. 2.

FIG. 3 is a perspective view of the fixing device 9. FIG. 4 is an exploded perspective view of the fixing device 9.

As illustrated in FIGS. 3 and 4, the fixing device 9 includes a device frame 40 that includes a first device frame 25 and a second device frame 26. The first device frame 25 includes a pair of side walls 28 as side plates and a front wall 27. The second device frame 26 includes a rear wall 29. One of the pair of side walls 28 is disposed at one end of the fixing belt 20 in the width direction of the fixing belt 20, and the other one of the pair of side walls 28 is disposed at the other end of the fixing belt 20 in the width direction. The side walls 28 support the pressure roller 21 and flanges 32 disposed at both ends of the fixing belt 20. Each side wall 28 has a plurality of engagement projections **28*a*. As the engagement projections 28*a* engage corresponding coupling holes 29*a* in the rear wall 29, the first device frame 25 is coupled to the second device frame 26**.

Each of the side walls 28 includes an insertion slot **28*b* through which a rotation shaft and the like of the pressure roller 21 are inserted. The insertion slot 28*b* opens toward the rear wall 29 and closes at a portion opposite the rear wall 29, and the portion of the insertion slot 28*b* opposite the rear wall 29 serves as a contact portion. A bearing 30 is disposed at an end of the contact portion to support the rotation shaft of the pressure roller 21. As both lateral ends of the rotation shaft of the pressure roller 21 are attached to the bearings 30, respectively, the side walls 28 rotatably support the pressure roller 21**.

A driving force transmission gear 31 serving as a drive transmitter is disposed at one end of the rotation shaft of the pressure roller 21 in an axial direction thereof. When the side walls 28 support the pressure roller 21, the driving force transmission gear 31 is exposed outside the side wall 28. Accordingly, when the fixing device 9 is installed in the image forming apparatus body 103 (see FIG. 1), the driving force transmission gear 31 is coupled to a gear disposed inside the image forming apparatus body 103 so that the driving force transmission gear 31 transmits the driving force from the driver to the pressure roller 21. Alternatively, the driving force transmitter to transmit the driving force to the pressure roller 21 may be pulleys over which a driving force transmission belt is stretched taut, a coupler, and the like instead of the driving force transmission gear 31.

A pair of flanges 32 as end holders that support the fixing belt 20 and the like is disposed at both sides of the fixing belt 20 in the longitudinal direction thereof, respectively. The flange 32 is a part of a device frame 40 of the fixing device 9. The flanges 32 support the fixing belt 20 in a state in which the fixing belt 20 is not basically applied with tension in a circumferential direction thereof while the fixing belt 20 does not rotate, that is, by a free belt system. Each flange 32 has a guide groove **32*a*. As edges of the insertion slot 28*b* of the side wall 28 enter the guide grooves 32*a*, respectively, the flange 32 is attached to the side wall 28**.

A pair of springs 33 serving as a pair of biasing members is interposed between the rear wall 29 and each of the flanges 32. As the springs 33 bias the flanges 32 and the stay 24 toward the pressure roller 21, respectively, the fixing belt 20 is pressed against the pressure roller 21 to form the fixing nip between the fixing belt 20 and the pressure roller 21.

As illustrated in FIG. 4, a hole **29*b* as a positioner is disposed near one end of the rear wall 29 of the second device frame 26 in a longitudinal direction of the second device frame 26. The hole 29*b* is a positioner to position the body of the fixing device 9 with respect to the image forming apparatus body 103. Similarly, the image forming apparatus body 103 includes a projection 101 as a positioner. When the body of the fixing device 9 is installed in the image forming apparatus body 103, a projection 101 is inserted into the hole 29*b* of the fixing device 9. Accordingly, the projection 101 engages the hole 29*b*, positioning the body of the fixing device 9 with respect to the image forming apparatus body 103 in a longitudinal direction of the fixing device 9. Although the hole 29*b* serving as the positioner is disposed near one end of the rear wall 29 in the longitudinal direction of the second device frame 26, a positioner is not disposed near another end of the rear wall 29. Thus, the second device frame 26 does not restrict thermal expansion and shrinkage of the body of the fixing device 9** in the longitudinal direction thereof due to temperature change.

Figure 5:
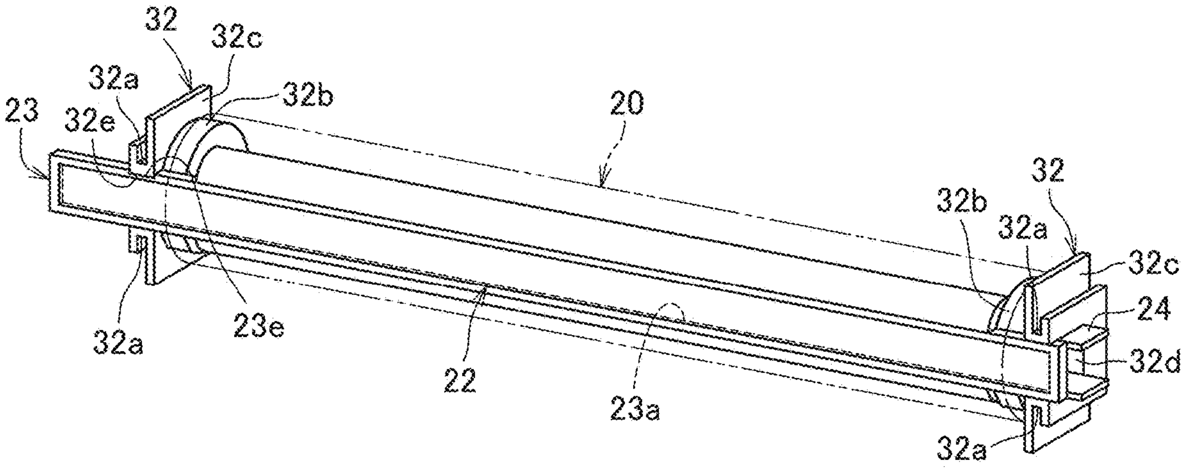
Figure 6:
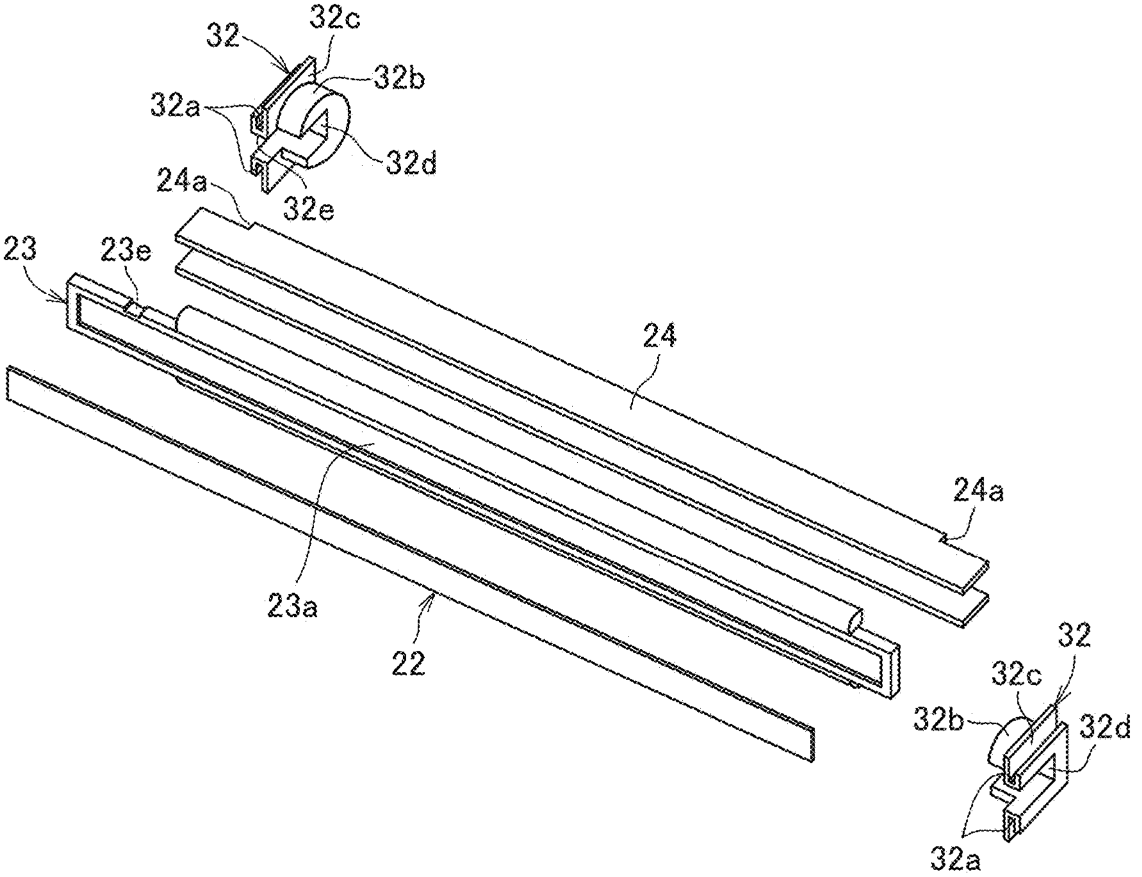
FIG. 6 is an exploded perspective view of the heater unit of FIG. 5.

FIG. 5 is a perspective view of a heater unit including the heater 22, the heater holder 23, and the flanges 32, and FIG. 6 is an exploded perspective view of the heater unit. In FIGS. 5 and 6, the shape of the heater holder 23 is simplified for the sake of convenience, and a specific shape thereof is described below.

As illustrated in FIGS. 5 and 6, the heater holder 23 includes an accommodating recess **23*a* disposed on a fixing belt side face of the heater holder 23, that faces the fixing belt 20 and the fixing nip N. The accommodating recess 23*a* is rectangular and accommodates the heater 22. A connector described below sandwiches the heater 22 and the heater holder 23 in a state in which the accommodating recess 23*a* accommodates the heater 22, thus holding the heater 22**.

In addition to the guide grooves **32*a* described above, each of the pair of flanges 32 includes a belt support 32*b*, a belt restrictor 32*c*, and a supporting recess 32*d*. The belt support 32*b* is C-shaped and inserted into the loop of the fixing belt 20, thus contacting the inner circumferential surface of the fixing belt 20 to support the fixing belt 20. The belt restrictor 32*c* has a flange shape and contacts an edge face of the fixing belt 20 to restrict motion (e.g., skew) of the fixing belt 20 in the longitudinal direction of the fixing belt 20. One ends of the heater holder 23 and the stay 24 are inserted into the supporting recess 32*d* of one of the flanges 32, and the other ends of the heater holder 23 and the stay 24 are inserted into the supporting recess 32*d* of the other one of the flanges 32. As a result, the flanges 32 support the heater holder 23 and the stay 24**.

As illustrated in FIGS. 5 and 6, the heater holder 23 includes a positioning recess **23*e* as a positioner disposed near one end of the heater holder 23 in the longitudinal direction thereof. The flange 32 further includes an engagement 32*e* illustrated in a left part in FIGS. 5 and 6. The engagement 32*e* engages the positioning recess 23*e*, positioning the heater holder 23 with respect to the flange 32 in the longitudinal direction. The flange 32 illustrated in a right part in FIGS. 5 and 6 does not include the engagement 32***e* and therefore the heater holder 23 is not positioned with respect to the flange 32 in the longitudinal direction of the heater holder 23. Thus, the flange 32 does not restrict thermal expansion and shrinkage of the heater holder 23 in the longitudinal direction thereof due to temperature change.

As illustrated in FIG. 4, as the guide grooves 32*a* of the flanges 32 move along the insertion slots 28*b* of the side walls 28, the flanges 32 is attached to the side walls 28 disposed at lateral ends of the device frame 40 in a longitudinal direction thereof. The flange 32, situated at a rear position in FIG. 4, of the two flanges 32 illustrated in FIG. 4 positions the heater holder 23 in the longitudinal direction thereof. As the flange 32 situated at the rear position in FIG. 4 is attached to the side wall 28, the heater holder 23 is positioned with respect to the side wall 28 in the longitudinal direction of the heater holder 23. Thus, the side wall 28 and the flange 32 serve as positioners that position the heater holder 23 with respect to the body of the fixing device 9 in the longitudinal direction of the heater holder 23.

The stay 24 is not positioned with respect to the flange 32 in the longitudinal direction of the stay 24. As illustrated in FIG. 6, the stay 24 includes steps 24*a* disposed at both lateral ends of the stay 24 in the longitudinal direction thereof, respectively. The steps 24*a* restrict motion (e.g., dropping) of the stay 24 with respect to the flanges 32, respectively, in the longitudinal direction of the stay 24. A gap is provided between the step 24*a* and at least one of the flanges 32 in the longitudinal direction of the stay 24. For example, the stay 24 is attached to the flanges 32 such that looseness is provided between the stay 24 and each of the flanges 32 in the longitudinal direction of the stay 24 so that the flanges 32 do not restrict thermal expansion and shrinkage of the stay 24 in the longitudinal direction thereof due to temperature change. That is, the stay 24 is not positioned with respect to one of the flanges 32.

Figure 7:
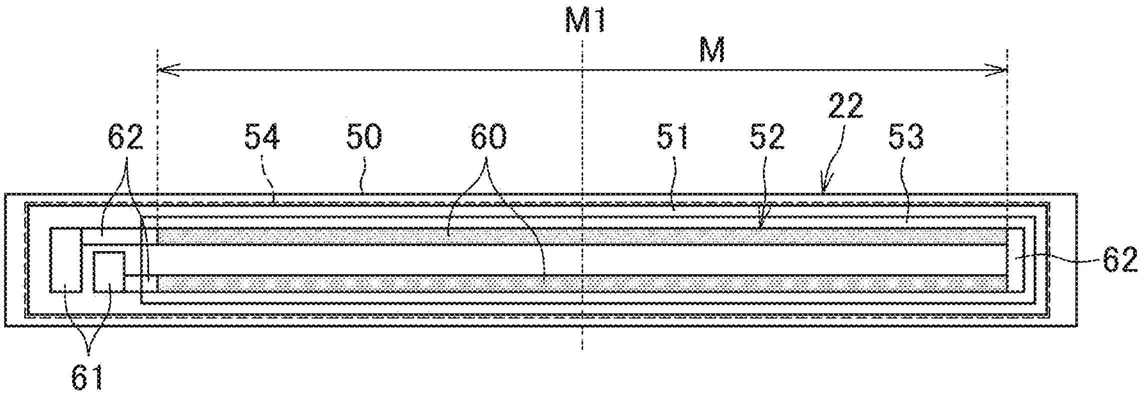
FIG. 7 is a plan view of a heater according to an embodiment of the present disclosure.
Figure 8:
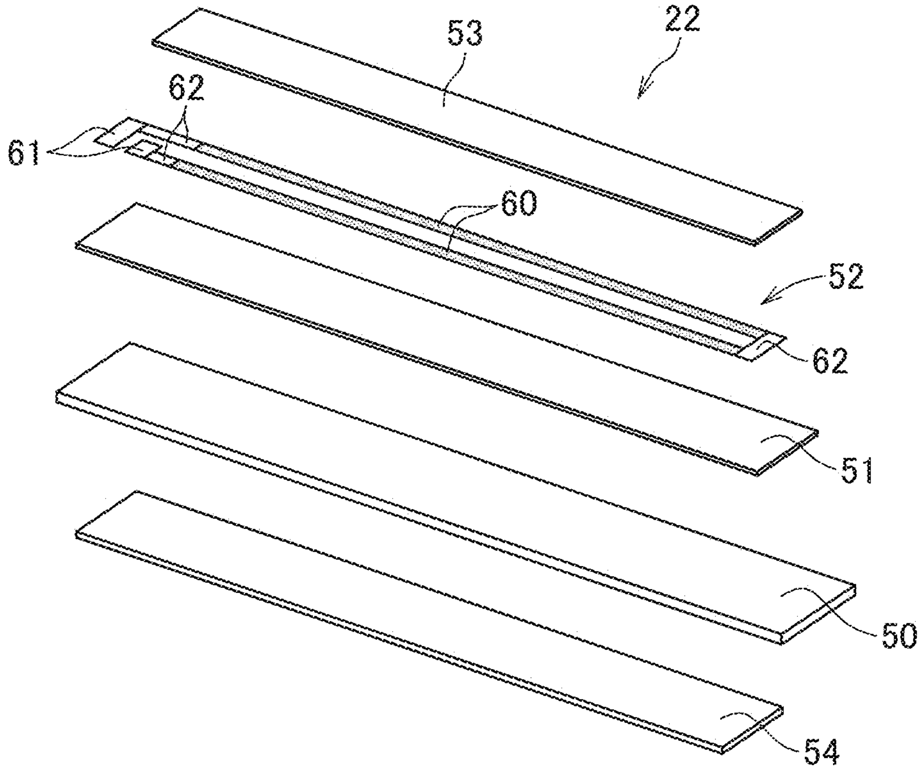
FIG. 8 is an exploded perspective view of the heater of FIG. 7.

FIG. 7 is a plan view of the heater 22. FIG. 8 is an exploded perspective view of the heater 22.

Hereinafter, a front side of the heater 22 defines a side that faces the fixing belt 20 and the fixing nip N. A back side of the heater 22 defines a side that faces the heater holder 23.

As illustrated in FIGS. 7 and 8, the heater 22 is constructed of a plurality of layers, that is, the base 50, the first insulation layer 51, the conductor layer 52, the second insulation layer 53, and the third insulation layer 54, which are laminated. The base 50 is platy. The first insulation layer 51 is mounted on the front side of the base 50. The conductor layer 52 is mounted on the front side of the first insulation layer 51. The second insulation layer 53 coats the front side of the conductor layer 52. The third insulation layer 54 is mounted on the back side of the base 50. The conductor layer 52 includes a pair of resistive heat generators 60, a pair of electrodes 61 as power supply portions, and a plurality of power supply lines 62. The electrodes 61 are disposed adjacent to one end of the resistive heat generators 60 in the longitudinal direction of the resistive heat generators 60. The power supply line 62 couples between the electrode 61 and the resistive heat generator 60, and another power supply line 62 couples between the pair of resistive heat generators 60. As illustrated in FIG. 7, at least a part of each of the electrodes 61 is not coated by the second insulation layer 53 and is exposed so that the electrodes 61 are connected to the connector described below.

The resistive heat generator 60 is produced by, for example, mixing silver-palladium (AgPd), glass powder, and the like into a paste. The paste is coated on the base 50 by screen printing or the like. Thereafter, the base 50 is fired to form the heat generator 60. Alternatively, the resistive heat generator 60 may be made of a resistive material such as a silver alloy (AgPt) and ruthenium oxide ($RuO_2$). In the present embodiment, the pair of resistive heat generators 60 extends in the longitudinal direction of the base 50 in parallel with each other. One end (e.g., a right end in FIG. 7) of one of the resistive heat generators 60 is electrically coupled to one end of another one of the resistive heat generators 60 through the power supply line 62. The other ends (e.g., a left end in FIG. 7) of resistive heat generators 60 electrically couple to the electrodes 61 via different power supply lines 62, respectively. The power supply lines 62 are made of conductors having an electrical resistance value smaller than the electrical resistance value of the resistive heat generators 60. Silver (Ag), silver palladium (AgPd) or the like may be used as a material of the power supply lines 62 or the electrodes 61. Screen-printing such a material forms the power supply lines 62 or the electrodes 61.

A span M illustrated in FIG. 7 indicates a main heat generation span of the heater 22 that is a span in which the resistive heat generators 60 are disposed in the longitudinal direction of the heater 22. Hereinafter, the span M is referred to as a heating span M of the heater 22. The center of the heating span M in the longitudinal direction is referred to as a center position M1. The center position M1 is also a center position in the longitudinal direction of the sheet P passing through the fixing device 9.

The base 50 is made of a metal material such as stainless steel (SUS), iron, or aluminum. The base 50 may be made of ceramic, glass, etc. instead of metal. If the base 50 is made of an insulating material such as ceramic, the first insulation layer 51 sandwiched between the base 50 and the conductor layer 52 may be omitted. Since metal has an excellent durability when it is rapidly heated and is processed readily, metal is preferably used to reduce manufacturing costs. Among metals, aluminum and copper are preferable because aluminum and copper have high thermal conductivity and are less likely to cause uneven temperature. Stainless steel is advantageous because stainless steel is manufactured at reduced costs compared to aluminum and copper.

Each of the first insulation layer 51, the second insulation layer 53, and the third insulation layer 54 is made of heat resistant glass. Alternatively, each of the first insulation layer 51, the second insulation layer 53, and the third insulation layer 54 may be made of ceramic, polyimide (PI), or the like.

Figure 9:
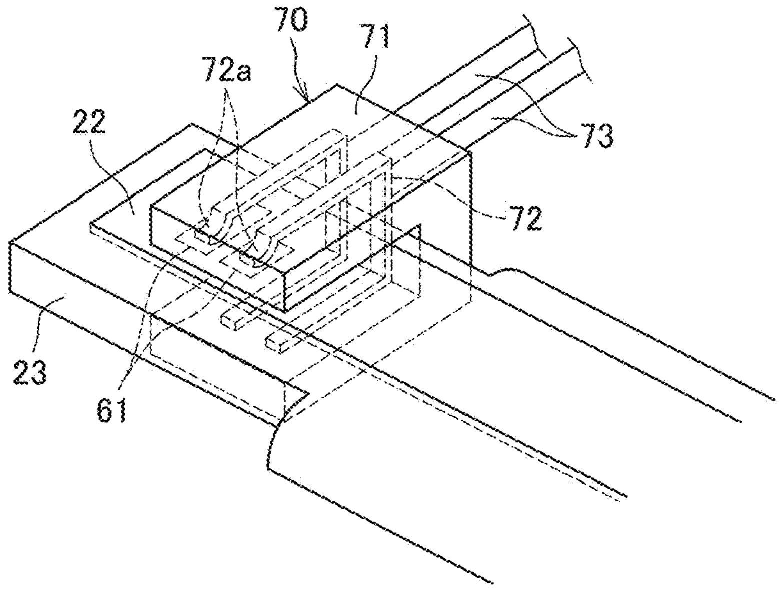
FIG. 9 is a perspective view of a connector attached to the heater of FIG. 7 and a heater holder.

FIG. 9 is a perspective view of the heater 22 and the heater holder 23, illustrating a connector 70 as the power supply member attached thereto.

As illustrated in FIG. 9, the connector 70 includes a housing 71 made of resin and a contact terminal 72 that is a flat spring anchored to the housing 71. The contact terminal 72 includes a pair of contacts 72*a* that contacts the electrodes 61 of the heater 22, respectively. The contact terminal 72 of the connector 70 is coupled to a harness 73 that supplies power.

As illustrated in FIG. 9, the connector 70 is attached to the heater 22 and the heater holder 23 such that the connector 70 sandwiches the heater 22 and the heater holder 23 together at the front side and the back side, respectively. Thus, the contacts 72*a* of the contact terminal 72 elastically contact and press against the electrodes 61 of the heater 22, and the resistive heat generators 60 are electrically coupled to the power supply provided in the image forming apparatus via the connector 70 and are powered by the power supply. In other words, the electrodes 61 are configured to supply power to the resistive heat generators 60.

In the above-described fixing device 9, rotations of the pressure roller 21 rotate the fixing belt 20, and the heater holder 23 and the heater 22 in contact with the inner circumferential surface of the fixing belt 20 receive a force in the rotation direction of the fixing belt 20. The force causes deformation (or positional deviation) such as bending of the heater 22 and the heater holder 23. The deformation causes the resistive heat generator 60 or the like in the heater 22 or the like to displace from its predetermined position.

Figure 10A:
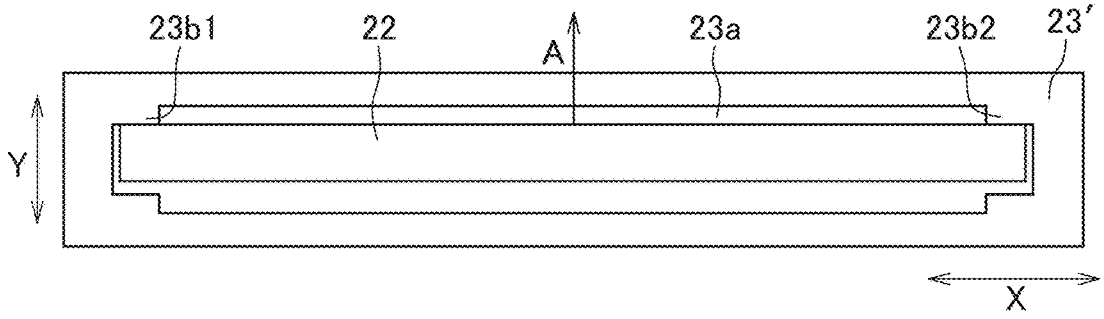
FIG. 10A is a top view of a heater including a different positioning portion from the embodiment of the present disclosure and not being deformed.
Figure 10B:
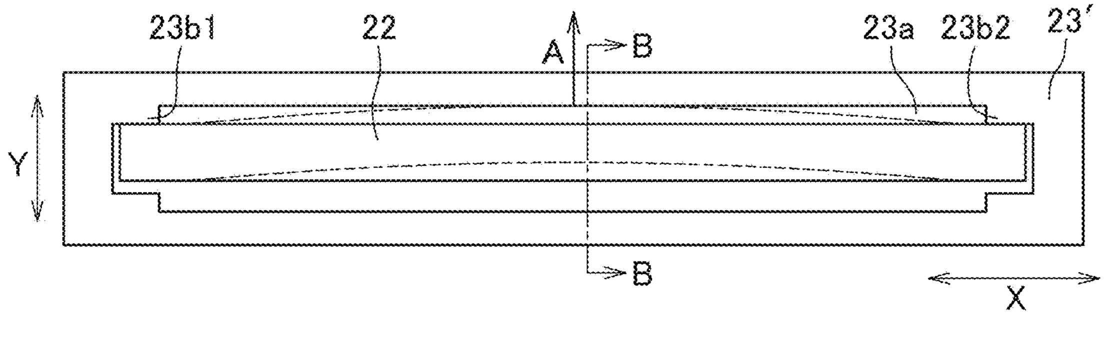
FIG. 10B is a top view of the heater including the different positioning portion from the embodiment of the present disclosure and being deformed.

With reference to FIGS. 10A and 10B, the following describes the above-descried deformation of the heater. A heater holder 23' illustrated in FIGS. 10A and 10B has a different heater positioning portion from that of the heater holder 23 in the present embodiment, which is described below, and the configuration of the heater holder 23' other than the heater positioning portion is the same as the configuration of the heater holder 23 other than the heater positioning portion. FIG. 10A illustrates the heater 22 that is not deformed, and FIG. 10B illustrates the heater 22 that is bent by a frictional force between the fixing belt 20 and the heater 22. A direction indicated by a double-headed arrow Y in FIGS. 10A and 10B is a short-side direction of the heater 22, the heater holder 23', and the like. The short-side direction is a direction intersecting the longitudinal direction (in particular, a direction orthogonal to the longitudinal direction in the present embodiment) and is different from the thickness direction of the heater 22 or the like. The short-side direction is also the same direction as the sheet conveyance direction.

As illustrated in FIG. 10A, the heater holder 23' has a recess 23*a* that is recessed away from the fixing belt 20 (in other words, recessed toward the left side of FIG. 2 or toward the back side from the sheet surface of FIG. 10A). The heater 22 is attached to the recess 23*a* and held by the heater holder 23'. In other words, the heater 22 is sandwiched by the heater holder 23' and the inner circumferential surface of the fixing belt 20 and held at a predetermined position in the fixing device 9.

The heater holder 23' has a first heater positioning portion 23*b*1 and a second heater positioning portion 23*b*2 that are two sides at both ends in the longitudinal direction on a downstream side of the recess 23*a* in the sheet conveyance direction (a left upper side and a right upper side of the recess 23*a* in FIG. 10A). The first heater positioning portion 23*b*1 and the second heater positioning portion 23*b*2 are parts of a downstream side wall of the recess 23*a* but protrude toward the upstream side in the sheet conveyance direction from the other part of the downstream side wall of the recess 23*a*. Hereinafter, the first heater positioning portion 23*b*1 and the second heater positioning portion 23*b*2 are also referred to as a heater positioning portion 23*b*.

The heater 22 receives a force from the fixing belt 20 in a direction indicated by arrow A in FIG. 10A, which is the same direction as the sheet conveyance direction, due to friction with the fixing belt 20. The force moves the heater 22 in the direction indicated by arrow A, and both ends, in the longitudinal direction, of the downstream side of the heater 22 abut on the first heater positioning portion 23*b*1 and the second heater positioning portion 23*b*2. As a result, the heater 22 is positioned with respect to the heater holder 23' in a short-side direction of the heater.

Positioning the heater 22 with respect to the heater holder 23' in the short-side direction using parts of the heater holder 23' in the longitudinal direction (that is, the first heater positioning portion 23*b*1 and the second heater positioning portion 23*b*2) as described above improves accuracy of positioning the heater 22 with respect to the heater holder 23'. For example, abutting the heater 22 from one end to the other end on a contact surface of the heater holder 23' to position the heater 22 with respect to the heater holder 23' needs dimensional accuracy over the entire contact surface of the heater holder 23'. In contrast, ensuring dimensional accuracy of parts of the contact surface of the heater holder 23' is enough to position the heater 22 when the parts, that is, the first heater positioning portion 23*b*1 and the second heater positioning portion 23*b*2 are used to position the heater 22 as described above. Accordingly, positioning the heater 22 with respect to the heater holder 23' using parts of the heater holder 23' improves the positional accuracy of the heater 22 with respect to the heater holder 23' and facilitates manufacturing the heater holder 23'.

However, when the heater 22 positioned at both ends in the longitudinal direction as described above receives the force in the direction indicated by arrow in FIG. 10B, the force bends the central portion of the heater 22 in the longitudinal direction as illustrated by the dotted lines in FIG. 10B.

Figure 11:
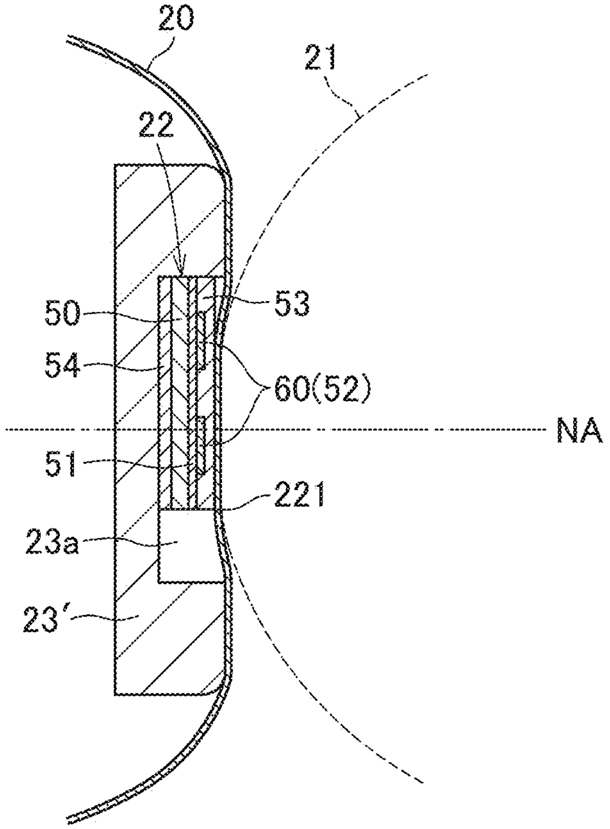
FIG. 11 is a side sectional view of the heater to illustrate a displacement of the heater.

FIG. 11 is a cross-sectional view of the central portion of the heater 22 taken along line B-B of FIG. 10B to illustrate a bent portion of the heater 22 bent by the force from the fixing belt 20. As illustrated in FIG. 11, the bent central portion of the heater 22 in the longitudinal direction is displaced downstream (in other words, to upper side in FIG. 11) with respect to an alternate long and short dash line NA passing through the central position of the fixing nip N in the sheet conveyance direction.

The heater 22 is placed so that the surface of the heater 22 facing the fixing belt 20 is farther from the fixing belt 20 than the surface of the heater holder 23' facing the fixing belt 20 (in other words, the surface of the heater 22 facing the fixing belt 20 is set left side from the surface of the heater holder 23' facing the fixing belt 20 in FIG. 11). Since the pressure roller 21 projects toward the fixing belt 20 and the heater 22 as illustrated in FIG. 11, the pressure roller 21 presses the fixing belt 20 to closely contact the heater 22 at a position close to the center line NA. In contrast, the heater 22 is less likely to come into contact with the fixing belt 20 at a position far from the center line NA, that is, at an end of the heater 22 in the sheet conveyance direction. When the heater 22 is not displaced and is at a target position as illustrated in FIG. 10A, the above-described configuration causes the resistive heat generator 60 to be in close contact with the fixing belt 20 on the central portion of the heater 22 in the sheet conveyance direction and effectively heat the fixing belt 20 and prevents a corner of the heater 22 at the end of the heater in the sheet conveyance direction from contacting the fixing belt 20, which prevents wear of the fixing belt 20 due to sliding between the corner of the heater 22 and the fixing belt 20.

However, when the heater 22 is bent and displaced toward downstream in the sheet conveyance direction as illustrated in FIG. 10B, a downstream portion of the resistive heat generator 60 is away from the center line NA and does not come into contact with the fixing belt 20. As a result, heat does not transfer from the downstream portion of the resistive heat generator 60 to the fixing belt 20. The above causes an excessive temperature rise in the heater 22, which causes damage to the heater 22.

An upstream corner 221 of the heater 22 displaced to the downstream approaches the center line NA, and the fixing belt 20 easily comes into contact with the corner 221. This causes wear of the fixing belt 20.

In recent years, the size of the fixing device is reduced, and the driving speed of the fixing device is increased. Reducing the size of the fixing device causes relative decrease in the rigidity of the heater 22. Increasing the driving speed of the fixing device increases a pressure applied from the pressure roller 21 to the fixing belt 20. Therefore, the frictional force generated between the fixing belt 20 and the heater 22 increases. As a result, solving the above-described disadvantages is important.

Figure 12:
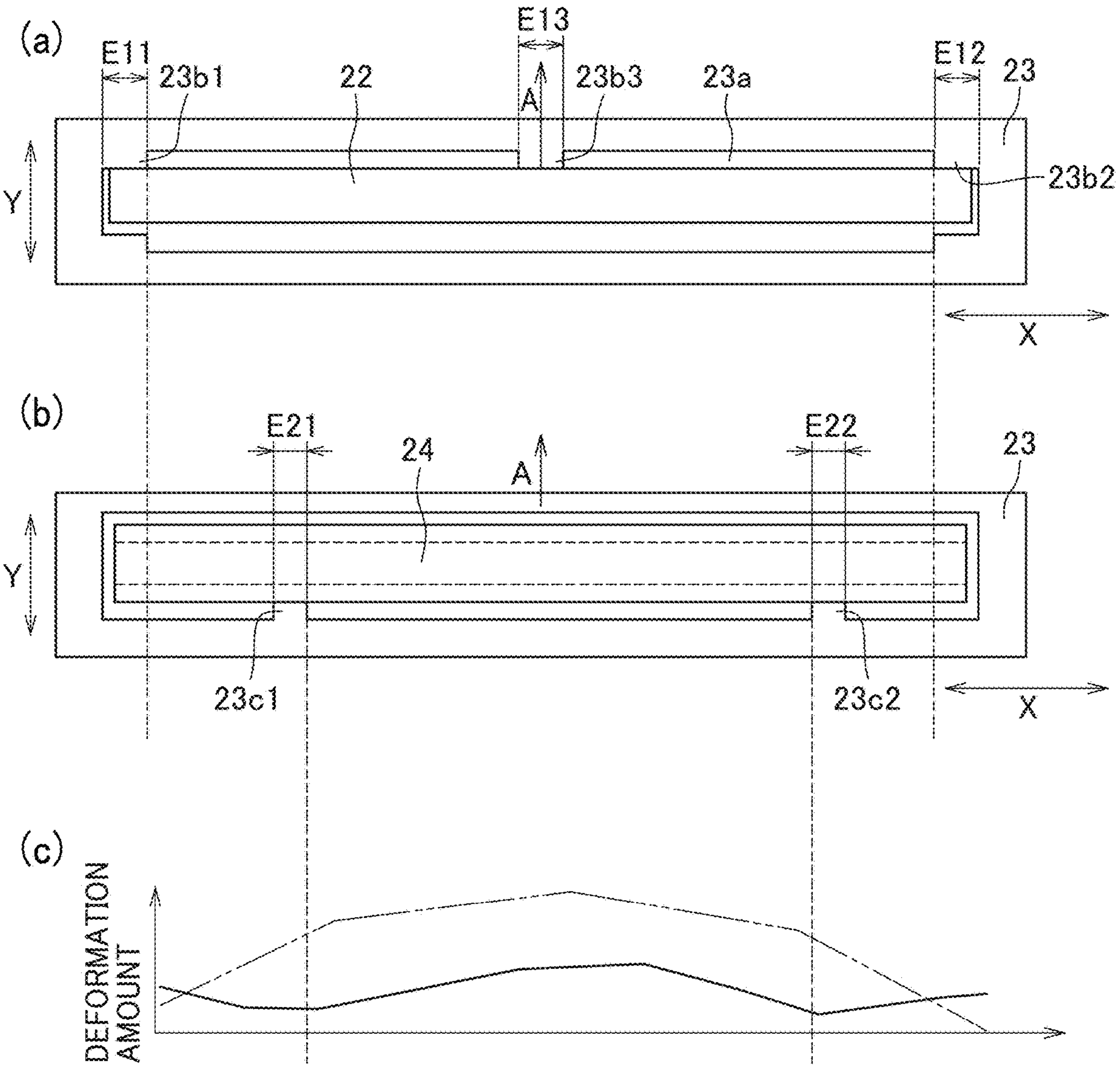
FIG. 12 is a schematic diagram illustrating a positioning configuration according to a first embodiment of the present disclosure and including (a) a plan view of the heater to illustrate heater positioning portions, (b) a plan view of the heater to illustrate holder positioning portions, and (c) a graph illustrating distributions in a longitudinal direction of deformation amounts of the heater holders in a short-side direction.

With reference to FIG. 12, the following describes the fixing device according to a first embodiment that solves the above-described issues. FIG. 12(*a*) is a view of the heater 22 and the heater holder 23 viewed from the fixing nip N (in other words, from a right side in FIG. 2), and FIG. 12(*b*) is a view of the heater holder 23 and the stay 24 viewed from the side opposite to the fixing nip N (in other words, from a left side in FIG. 2). The upper side in FIGS. 12(*a*) and 12(*b*) is the downstream side in the sheet conveyance direction.

As illustrated in FIG. 12(*a*), the heater holder 23 of the present embodiment has a third heater positioning portion 23*b*3 as a third pad positioning portion at the center in the longitudinal direction in addition to the first heater positioning portion 23*b*1 as a first pad positioning portion and the second heater positioning portion 23*b*2 as a second pad positioning portion on both sides in the longitudinal direction. The first heater positioning portion 23*b*1 is disposed on one end portion from the center position M1 (see FIG. 7) of the heating span M of the heater 22 in the longitudinal direction. The second heater positioning portion 23*b*2 is disposed on the other end portion from the center position M1 in the longitudinal direction. In addition, the third heater positioning portion 23*b*3 is disposed at a position closer to the center position M1 than the heater positioning portions 23*b*1 and 23*b*2. Note that the position closer to the center position M1 includes the center position M1.

Abutting the heater 22 on the third heater positioning portion 23*b*3 prevents the center portion of the heater 22 in the longitudinal direction from bending. In other words, the above-described configuration can prevent the heater 22 from bending as illustrated in FIG. 11 (or prevent a positional deviation of the center portion to the downstream side as illustrated in FIG. 11). As a result, the damage and wear of the heater 22 can be prevented. In FIG. 12(*a*), the upstream side wall of the recess 23*a* has projections projected to the heater 22 at both end portions of the upstream side wall in the longitudinal direction.

Abutting the heater 22 on the heater positioning portions 23*b* as described above presses the heater holder 23 toward downstream in the sheet conveyance direction. Pressing the heater holder 23 toward downstream may bend the heater holder 23 toward downstream. In particular, heat from the heater 22 decreases the rigidity of the heater holder 23 made of resin even if the resin is a heat-resistant material. As a result, the heater holder 23 is likely to be bent.

Deformation of the heater holder 23 toward downstream in the sheet conveyance direction causes positional deviations of positions of the heater 22 positioned by the first to third heater positioning portions 23*b*1 to 23*b*3 toward downstream by deformation amounts of the heater holder 23. As a result, the deformation of the heater holder 23 cause bending or displacement of the heater 22.

As illustrated in FIG. 12(*b*), the heater holder 23 in the present embodiment has a first holder positioning portion 23*c*1 as a first holder positioning portion and a second holder positioning portion 23*c*2 as a second holder positioning portion that position the heater holder 23 with respect to the stay 24. Hereinafter, the holder positioning portions 23*c*1 and 23*c*2 are also referred to as holder positioning portions 23*c*.

Abutting each of the first holder positioning portion 23*c*1 and the second holder positioning portion 23*c*2 on an upstream side of the stay 24 in the sheet conveyance direction positions the heater holder 23 with respect to the stay 24 in the sheet conveyance direction. The above-described configuration prevents bending of the heater holder 23 caused by the heater 22 pressed toward downstream in the sheet conveyance direction. As a result, the deformation of the heater 22 is prevented. Accordingly, the damage and wear of the heater 22 can be prevented.

In particular, the holder positioning portions 23*c*1 and 23*c*2 in the present embodiment are disposed closer to the center position M1 in the longitudinal direction than the heater positioning portions 23*b*1 and 23*b*2. Specifically, the holder positioning portions 23*c*1 and 23*c*2 are disposed at positions closer to the center position M1 (see FIG. 7) of the heating span M of the heater 22 than the heater positioning portions 23*b*1 and 23*b*2. The above-described configuration can effectively prevent bending of the center portions of the heater holder 23 and the heater 22 in the longitudinal direction. In the above, disposing the holder positioning portions 23*c*1 and 23*c*2 at positions closer to the center position M1 than the heater positioning portions 23*b*1 and 23*b*2 includes disposing one of the holder positioning portions 23*c*1 and 23*c*2 at the center position M1. In addition, for example, the holder positioning portion 23*c*1 being closer to the center position M1 than the heater positioning portion 23*b*1 means that a portion of the holder positioning portion 23*c*1 closest to the center position M1 is disposed at a position closer to the center position M1 than the heater positioning portion 23*b*1.

Note that both the holder positioning portions 23*c*1 and 23*c*2 may not necessarily be disposed closer to the center position M1 in the longitudinal direction than the heater positioning portions 23*b*1 and 23*b*2. However, disposing the holder positioning portions 23*c*1 and 23*c*2 on the one and the other end in the longitudinal direction, respectively, and disposing the holder positioning portions 23*c*1 and 23*c*2 closer to the center position M1 in the longitudinal direction than the heater positioning portions 23*b*1 and 23*b*2, respectively, can effectively prevent the bending of the heater holder 23.

FIG. 12(*c*) is a graph illustrating a distribution of bending amounts in the longitudinal direction of the heater holder 23. The horizontal axis indicates positions of the heater holder 23 in the longitudinal direction, and the vertical axis indicates the bending amounts (deformation amounts) in the short-side direction of the heater holder 23. A solid line in the graph indicates the bending amounts of the heater holder 23 in the fixing device of the present embodiment, and an alternate long and two short dashes line in the graph indicates the bending amounts of the heater holder 23 in the fixing device of the comparative embodiment, to be specific, the fixing device in which the stay 24 does not have the holder positioning portions 23*c*1 and 23*c*2.

As can be seen from the comparison between the solid line and the alternate long and two short dashes line in FIG. 12(*c*), the holder positioning portions 23*c*1 and 23*c*2 positioning the heater holder 23 reduces the bending amounts of the heater holder 23 particularly at the positions of the holder positioning portions 23*c*1 and 23*c*2 in the longitudinal direction and in the vicinity thereof. In particular, disposing the holder positioning portions 23*c*1 and 23*c*2 closer to the center position M1 in the longitudinal direction than the heater positioning portions **23*b*1 and 23*b*2 effectively reduces the bending amounts of the center portion of the heater holder 23** in the longitudinal direction that is a largely bent portion in the comparative embodiment.

The longitudinal widths E11, E12, and E13 of the heater positioning portions **23*b* are larger than the longitudinal widths E21 and E22 of the holder positioning portions 23*c*. The heater 22 is thin, and the depth of the recess 23*a* is small. Accordingly, designing the widths E11, E12, and E13 in the longitudinal direction be large is preferable in order to secure the strength of the heater positioning portions 23*b*. However, the longitudinal widths of all the heater positioning portions 23*b* may not necessarily be larger than the longitudinal widths of all the holder positioning portions 23*c***.

On the contrary, the longitudinal widths E11, E12, and E13 of the heater positioning portions **23*b* may be smaller than the longitudinal widths E21 and E22 of the holder positioning portions 23*c*. Since reducing the longitudinal widths E11, E12, and E13 of the heater positioning portions 23*b* reduces the amount of heat transfer from the heater 22 to the heater holder 23, the heater 22 can efficiently heat the fixing belt 20. However, the longitudinal widths of all the heater positioning portions 23*b* may not necessarily be smaller than the longitudinal widths of all the holder positioning portions 23*c***.

As illustrated in FIG. 12(*b*), disposing the holder positioning portions **23*c* on the one end and the other end of the heater holder 23 in the longitudinal direction (more specifically, on the one end portion and the other end portion from the center position M1 in FIG. 7), respectively can position both ends of the heater holder 23 with respect to the stay 24 in the longitudinal direction and stabilize the posture of the heater holder. However, the configuration of the holder positioning portions 23*c* is not limited to this. For example, a single holder positioning portion 23*c* may be disposed from one end to the other end of the heater holder 23** in the longitudinal direction.

In the embodiment of FIGS. 12(*a*) and 12(*b*), the heater positioning portions **23*b* and the holder positioning portions 23*c* are disposed symmetrically in a lateral direction with respect to the center position M1 (see FIG. 7) of the heating span M of the heater 22. The above-described configuration can equally position both ends of the heater 22 and the heater holder 23** in the longitudinal direction.

The fixing belt 20 of the present embodiment may include the base made of polyimide. The fixing belt 20 made of polyimide is more flexible than the fixing belt including the metal base. Accordingly, even when the heater 22 is displaced in the short-side direction with respect to the fixing belt 20 as illustrated in FIG. 11, the fixing belt 20 easily comes into contact with the heater 22, which prevents the excessive temperature rise caused by the heat not transferring from the downstream portion of the resistive heat generator 60 to the fixing belt 20. Accordingly, the fixing device including the positioning configuration of the present embodiment and the fixing belt made of polyimide can more reliably prevent the excessive temperature rise in the heater 22. On the other hand, when the heater 22 is displaced in the short-side direction in the fixing device including the fixing belt 20 with the metal base, the fixing belt 20 is likely to be away from the downstream portion of the heater 22 in the sheet conveyance direction, which may cause the excessive temperature rise. As a result, it is preferable to apply the above-described positioning configuration to the fixing device as the heating device.

The fixing belt 20 of the present embodiment may be a rubberless belt including no elastic layer. The fixing belt 20 including no elastic layer is more flexible than the fixing belt including the elastic layer. Accordingly, even when the heater 22 is displaced in the short-side direction with respect to the fixing belt 20 as illustrated in FIG. 11, the fixing belt 20 easily comes into contact with the heater 22, which prevents the excessive temperature rise caused by the heat not transferring from the downstream portion of the resistive heat generator 60 to the fixing belt 20. Accordingly, the fixing device including the positioning configuration of the present embodiment and the fixing belt including no elastic layer can more reliably prevent the excessive temperature rise in the heater 22. Specifically, the fixing belt 20 includes the tubular base and the release layer serving as the outermost surface layer as described above.

The fixing device as the heating device of the present embodiment includes the heater holder 23 made of resin and the stay 24 made of the material having a larger rigidity than the heater holder 23 such as metal. The above-described configuration prevents heat transfer from the heater 22 to the heater holder 23 and improves an energy saving performance of the fixing device 9. In addition, since the stay 24 having the larger rigidity supports the heater holder 23 and the heater 22, the positional accuracy of the heater 22 is improved.

The following describes variations of the heater positioning portions and the holder positioning portions that are arranged differently from the above.

Figure 13:
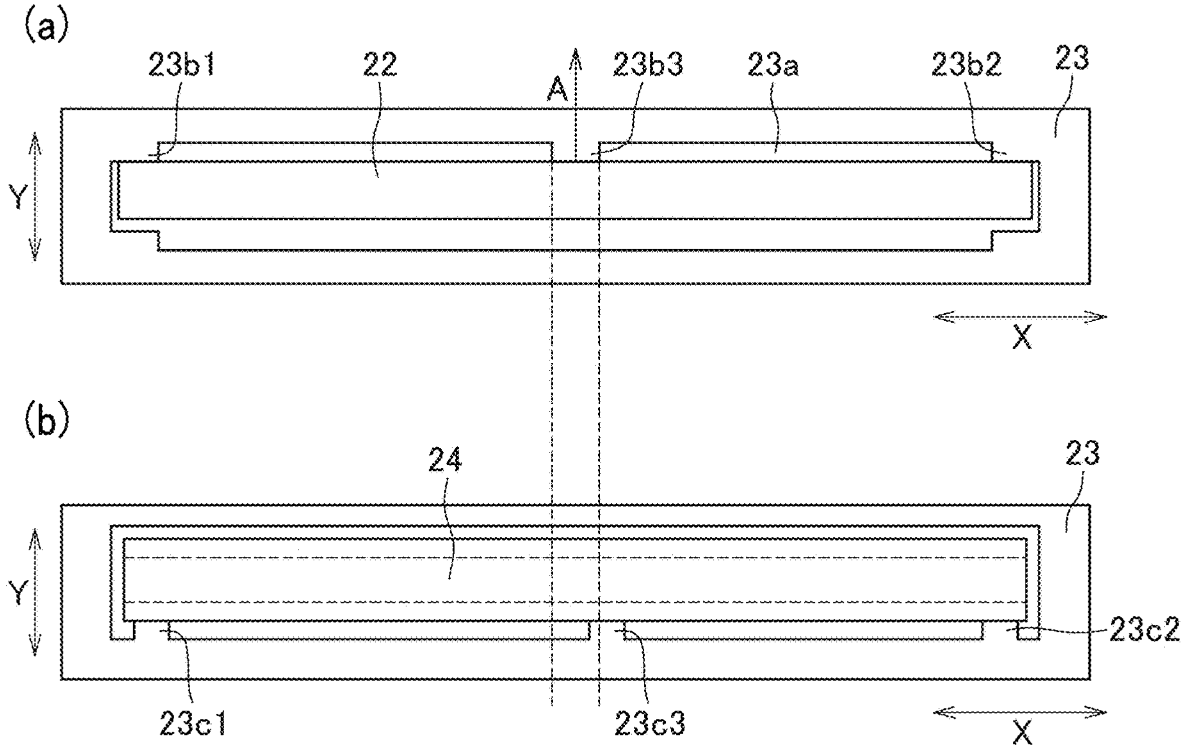
FIG. 13 is a schematic diagram illustrating a positioning configuration according to a second embodiment of the present disclosure and including (a) a plan view of the heater to illustrate heater positioning portions and (b) a plan view of the heater to illustrate holder positioning portions.

FIG. 13 is a schematic diagram illustrating a positioning configuration according to a second embodiment of the present disclosure. As illustrated in FIGS. 13(*a*) and 13(*b*), the heater holder 23 in the second embodiment includes a third holder positioning portion **23*c*3 on the center portion of the heater holder 23 in the longitudinal direction in addition to the first holder positioning portion 23*c*1 and the second holder positioning portion 23*c*2**.

In the longitudinal direction, the third holder positioning portion **23*c*3 partially overlaps the third heater positioning portion 23*b*3. At the positions of the heater positioning portions 23*b* in the longitudinal direction, the heater holder 23 is pressurized by the heater 22 and particularly easily deformed. Accordingly, disposing the holder positioning portion 23*c* at the above-described position effectively prevents the deformation of the heater holder 23 and the deformation of the heater 22**.

In the embodiment illustrated in FIG. 13, the third holder positioning portion **23*c*3 overlaps the third heater positioning portion 23*b*3, but the positions of other positioning portions in the longitudinal direction may overlap. In this case, similar to the above, deformation of the heater holder 23** can be effectively prevented.

It is preferable that the heater positioning portion **23*b* (in the present embodiment, the third heater positioning portion 23*b*3) or the holder positioning portion 23*c* (in the present embodiment, the third holder positioning portion 23*c*3) be disposed at the center position M1 (see FIG. 7) of the heat generation span M of the heater 22. The above-described configuration positions each of the heater 22 and the heater holder 23 at the position at which the heater 22 or the heater holder 23 is most likely to be bent and effectively prevents the bending of the heater 22 and the heater holder 23**.

Figure 14:
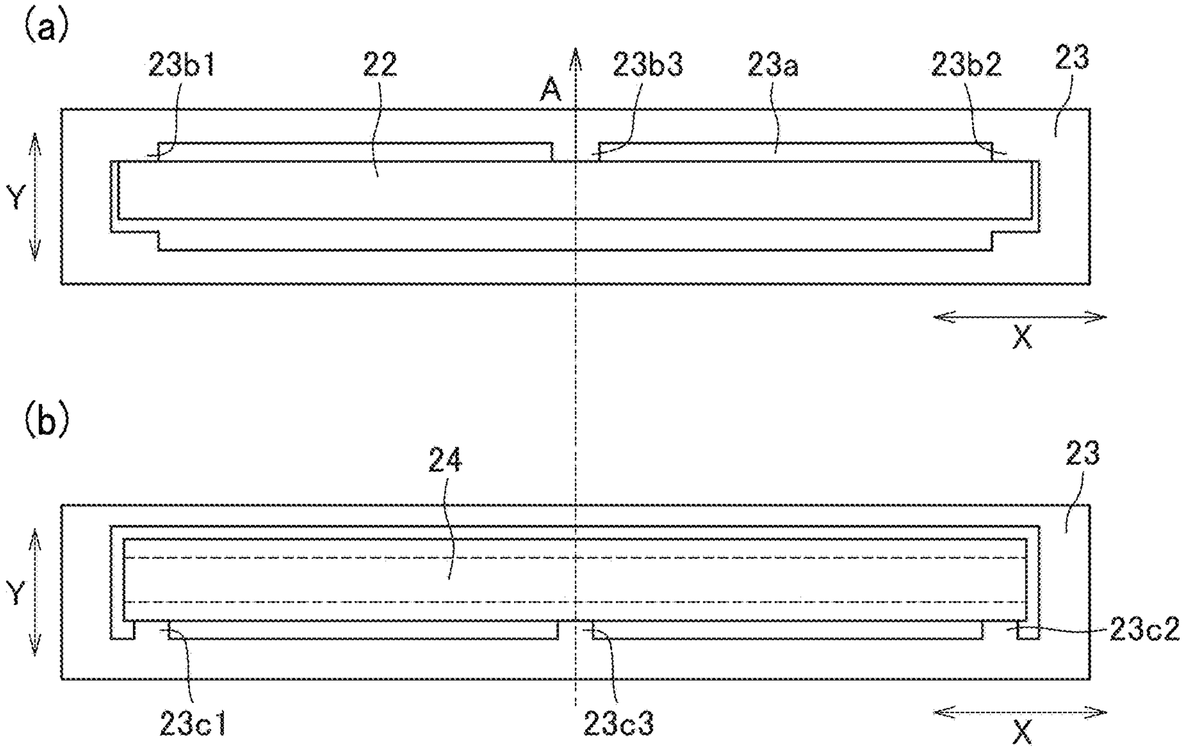
FIG. 14 is a schematic diagram illustrating a positioning configuration according to a third embodiment of the present disclosure and including (a) a plan view of the heater to illustrate heater positioning portions and (b) a plan view of the heater to illustrate holder positioning portions.

FIG. 14 is a schematic diagram illustrating a positioning configuration according to a third embodiment of the present disclosure. In the heater holder 23 illustrated in FIGS. 14(*a*) and 14(*b*), the longitudinal center position of the third holder positioning portion **23*c*3 coincides with the longitudinal center position of the third heater positioning portion 23*b*3 (see the dotted line in FIG. 14). The above-described configuration can effectively prevent deformation of the heater holder 23. Additionally, it is preferable that the longitudinal center positions of the third holder positioning portion 23*c*3 and the third heater positioning portion 23*b*3 coincide with the center position M1**.

Preferably, the configuration including the positioning portions of each above embodiment is applied to the fixing device 9 including the resistive heat generator 60 flowing a current having a component in the short-side direction and having a FC characteristic.

The PTC characteristic is a characteristic in which the resistance value increases as the temperature increases, for example, a heater output decreases under a given voltage. The resistive heat generator 60 having the PTC characteristic increases the output of the heater 22 under low temperature and can rapidly increase the temperature of the fixing belt 20. In contrast, the resistive heat generator 60 having the PTC characteristic decreases the output of the heater 22 under high temperature and can prevent overheating of the heater 22 and the fixing belt 20 in a non-sheet conveyance span caused by continuously printing small sheets.

However, when the heater 22 including the resistive heat generator 60 having the PTC characteristic and flowing the current having the component in the short-side direction as described above is displaced in the short-side direction as illustrated in FIG. 11, the resistive heat generator 60 having the PTC characteristic adversely affects the excessive temperature rise of the heater 22. When the heater 22 is displaced in the short-side direction as illustrated in FIG. 11, a part of the resistive heat generator 60 in the sheet conveyance direction (the upper part of the resistive heat generator 60 in FIG. 11) is not in contact with the fixing belt 20, the temperature at the part of the resistive heat generator 60 increases, and the resistance value of the part increases. The current flows in the resistive heat generator 60 in the short-side direction (that is a vertical direction in FIG. 11). Since an upstream portion of the resistive heat generator 60 is in contact with the fixing belt 20, the temperature in the upstream portion does not increase, and the resistance value of the upstream portion does not increase. As a result, a current value flowing in the resistive heat generator 60 does not largely change. A heat generation amount of the resistive heat generator 60 is proportional to the current value and the square of the resistance value. The resistance value of the above-described part of the resistive heat generator increases, and the current value hardly changes. As a result, the above-described increase of the resistance value in the part of the resistive heat generator increases the heat generation amount of the resistive heat generator 60.

Figure 15:
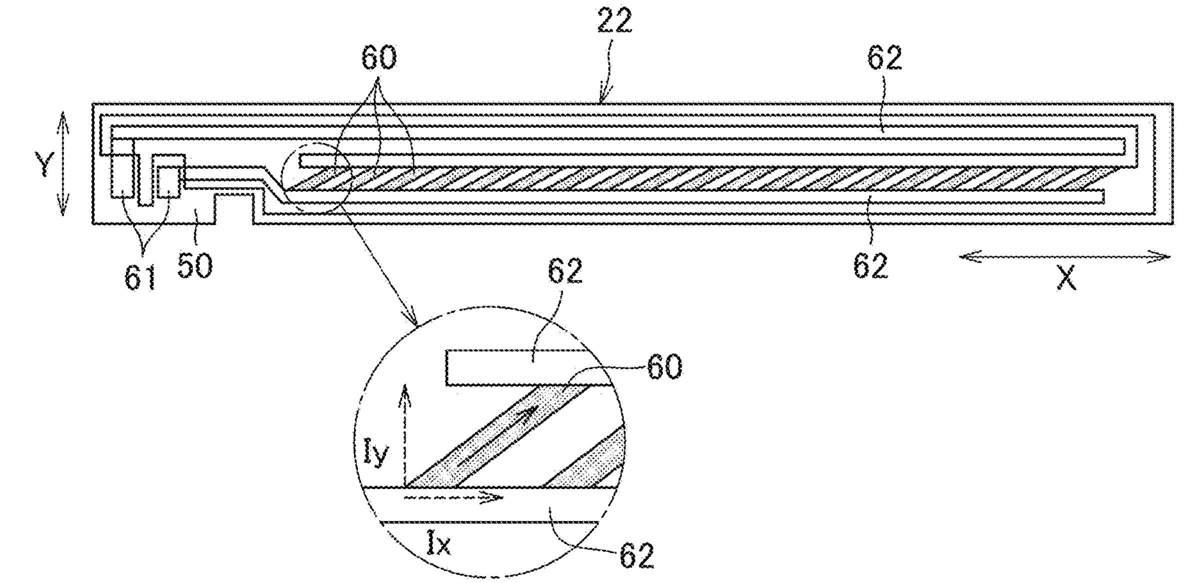
FIG. 15 is a plan view of a heater having a different configuration from that of FIG. 7.

FIG. 15 is a plan view of the heater 22 including the above-described resistive heat generator 60. The resistive heat generator 60 disposed in the heater 22 of FIG. 15 has the PTC characteristic. The current flowing through the resistive heat generator 60 has a component Iy flowing in the short-side direction. In the above-described heater 22, since the excessive temperature rise is likely to occur when the heater 22 is bent and displaced as described above, it is particularly preferable to prevent the deformation of the heater 22 by the configuration of the positioning portion of the present embodiment.

The following describes different types of the heaters from the heater 22 of FIG. 7 and positioning configurations in the different types of the heaters, according to embodiments of the present disclosure.

Figure 16:
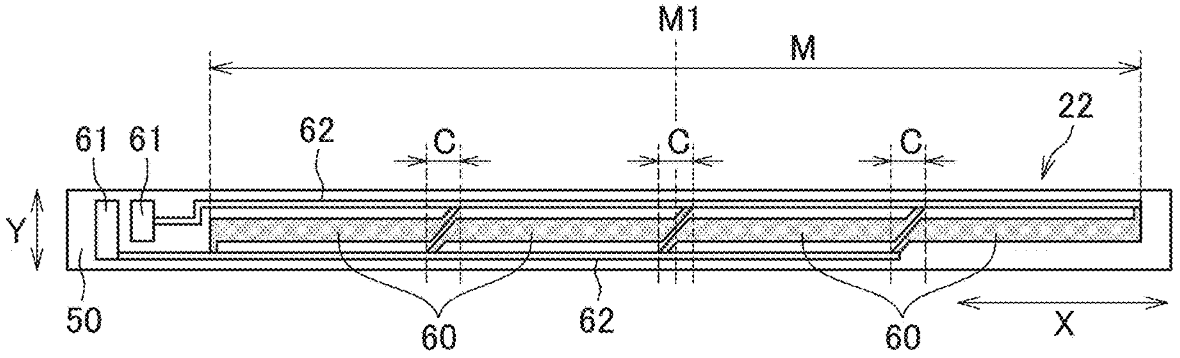
FIG. 16 is a plan view of a heater having a different configuration from that of FIG. 7.
Figure 17:
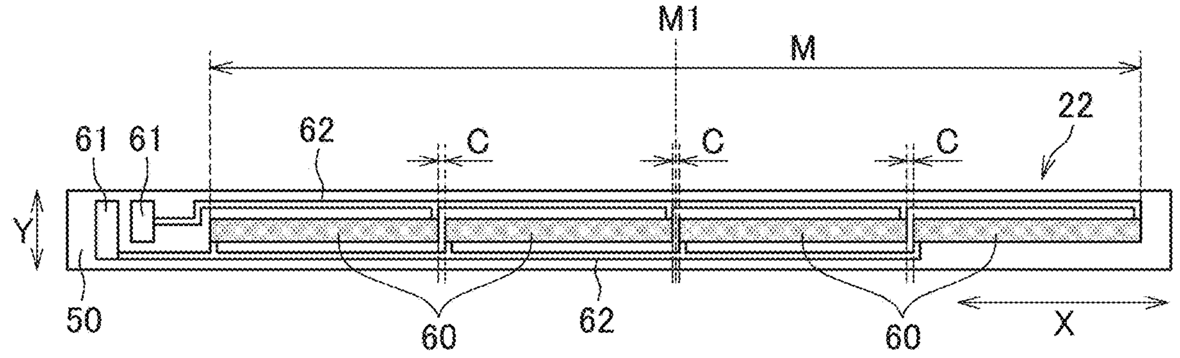
FIG. 17 is a plan view of a heater having a different configuration from that of FIG. 7.

As illustrated in FIG. 16, the heater 22 includes a plurality of (four in FIG. 16) resistive heat generators 60 separated from each other in the longitudinal direction and coupled in parallel. A separation area C is designed between the resistive heat generators 60. In the separation area C, the resistive heat generator 60 is not disposed. In other words. the separation area is a portion in which the area occupied by the resistive heat generators 60 in the longitudinal direction of the heater 22 is small. The heat generation amount generated by the heater 22 is small in the separation area C. For example, FIG. 17 is a plan view of the heater 22 including rectangular resistive heat generators 60. In FIG. 17, the heat generation amount is small in the separation area C between the resistive heat generators 60. In the heater 22 illustrated in FIG. 16, the heat generation span M is a span in which the resistive heat generators 60 are disposed in the longitudinal direction and the range including the separation area C. The separation area C is an area extending in the longitudinal direction and including the entire portion between the resistive heat generators 60 separated from each other in the longitudinal direction.

Each of the resistive heat generators 60 illustrated in FIG. 16 may have the PTC characteristic. When small sheets pass through the fixing device, the temperature of the resistive heat generator 60 corresponding to the non-sheet conveyance span increases. Since the PTC characteristic increases the resistance value of the resistive heat generator 60 in which the temperature increases, the PTC characteristic reduces the amount of heat generated by the resistive heat generator 60 corresponding to the non-sheet conveyance span. As a result, the PTC characteristic prevents the excessive temperature rise in the non-sheet conveyance spans of the heater 22 and the fixing belt 20.

Figure 18:
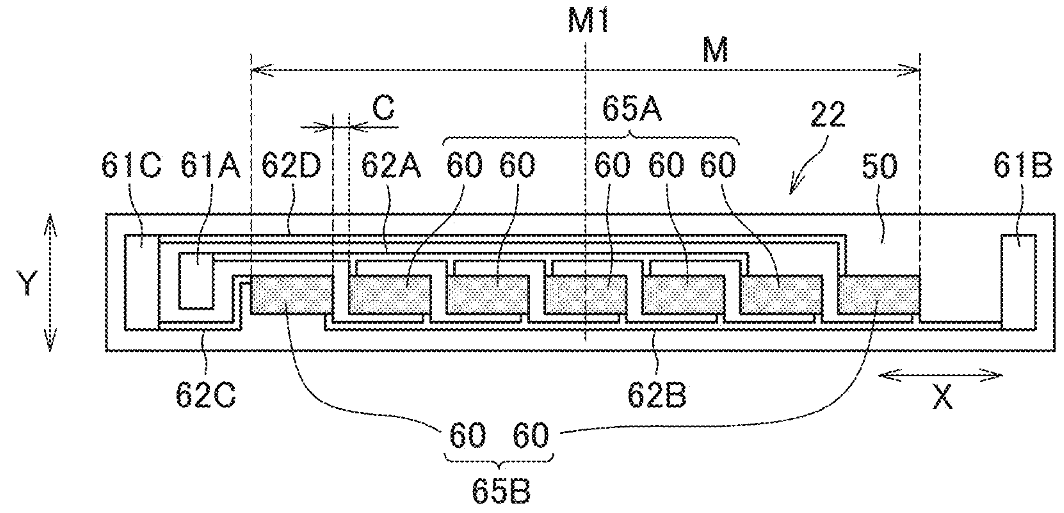
FIG. 18 is a plan view of a heater having a different configuration from that of FIG. 7.

The heater 22 may include a plurality of heating portions 65A and 65B configured by resistive heat generators 60 as illustrated in FIG. 18. The heater 22 includes a plurality of resistive heat generators 60 arranged in the longitudinal direction of the base 50. The plurality of resistive heat generators includes a central heating portion 65A and end heating portion 65B. The central heating portion 65A includes the resistive heat generators 60 other than the resistive heat generators 60 on the both ends of the plurality of resistive heat generators 60. The end heating portion 65B includes the resistive heat generators 60 on the both ends of the resistive heat generators 60. The central heating portion 65A and the end heating portion 65B are separately controllable to independently generate heat. Specifically, each of the resistive heat generators 60 constructing the central heating portion 65A (i.e., the resistive heat generators 60 other than the resistive heat generators 60 arranged on the ends) is connected, through a first power supply line 62A, to a first electrode 61A provided on a first longitudinal end side of the base 50. Each of the resistive heat generators 60 constructing the central heating portion 65A is also connected, through a second power supply line 62B, to a second electrode 61B provided on a second longitudinal end side of the base 50 opposite the first longitudinal end side of the base 50 on which the first electrode 61A is provided. On the other hand, each of the resistive heat generators 60 constructing the end heating portion 65B (i.e., the resistive heat generators 60 on the ends) is connected, through a third power supply line 62C or a fourth power supply line 62D, to a third electrode 61C (different from the first electrode 61A) provided on the first longitudinal end side of the base 50. Like each of the resistive heat generators 60 of the central heating portion 65A, each of the resistive heat generators 60 arranged on the ends is also connected to the second electrode 61B through the second power supply line 62B.

Applying the voltage to the first electrode 61A and the second electrode 61B energizes the resistive heat generators 60 other than the end resistive heat generators 60, and the central heating portion 65A generates heat alone. On the other hand, applying the voltage to the second electrode 61B and the third electrode 61C energizes the end resistive heat generators 60, and the end heating portion 65B generates heat alone. When the voltage is applied to all the first to third electrodes 61A to 61C, the resistive heat generators 60 of both the central heating portion 65A and the end heating portion 65B (i.e., all the resistive heat generators 59) generate heat. For example, the central heating portion 65A generates heat alone to fix the toner image on a sheet P having a relatively small width conveyed, such as the sheet P of A4 size (sheet width: 210 mm) or a smaller sheet P, and the end heating portion 65B generates heat together with the central heating portion 65A to fix a toner image on a sheet P having a relatively large width conveyed, such as a sheet P larger than A4 size (sheet width: 210 mm). As a result, the heater 22 can have the heat generation span corresponding to the sheet width.

In the heater 22 as described above, the heat generation amount is also small in the separation area C between the resistive heat generators 60. Although a mark "C" is at one separation area C between the resistive heat generator 60 at the left end and the adjacent resistive heat generator 60 in FIG. 18, the separation areas C are actually formed between all of the resistive heat generators 60.

Figure 19:
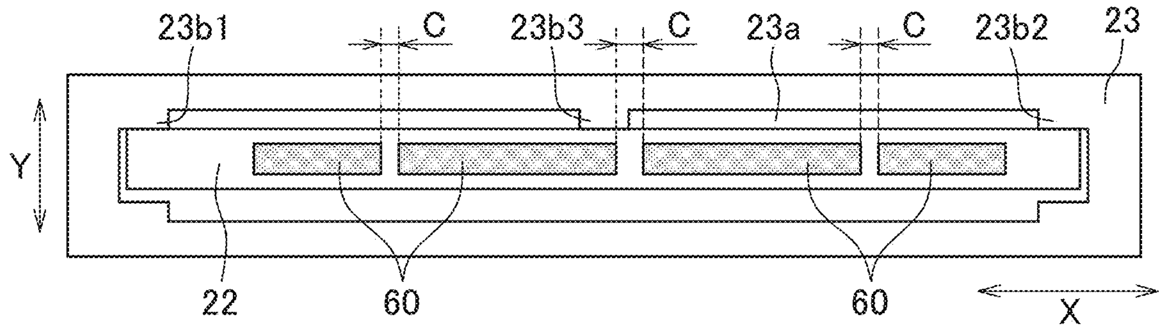
FIG. 19 is a plan view of a heater to illustrate a positioning configuration according to a fourth embodiment of the present disclosure.

The heater 22 including the plurality of resistive heat generators 60 arranged in the longitudinal direction may include the following positioning configurations including the above-described positioning portion disposed at a position corresponding to the separation area C in the longitudinal direction. FIG. 19 is a plan view of a heater 22 to illustrate a positioning configuration according to a fourth embodiment of the present disclosure. Specifically, the heater positioning portion **23*b*3, for example, is disposed at a position corresponding to the separation area C in the longitudinal direction as illustrated in FIG. 19. The heat generation amount of the heater 22 is small in the separation area C, and a deformation amount of the heater 22 due to thermal expansion is small in the separation area C. A deformation amount of the heater holder 23 due to thermal expansion is small near the separation area C. Accordingly, disposing the heater positioning portion 23*b*3 at a position corresponding to the separation area C enables the heater positioning portion 23*b*3 to accurately position the heater 22 in the short-side direction. In addition, not only the heater positioning portion 23*b* but also the holder positioning portion 23*c* may be disposed at a position corresponding to the separation area C. The above-described configuration can accurately position the heater holder 23 in the short-side direction and, as a result, accurately position the heater 22** in the short-side direction.

Figure 20:
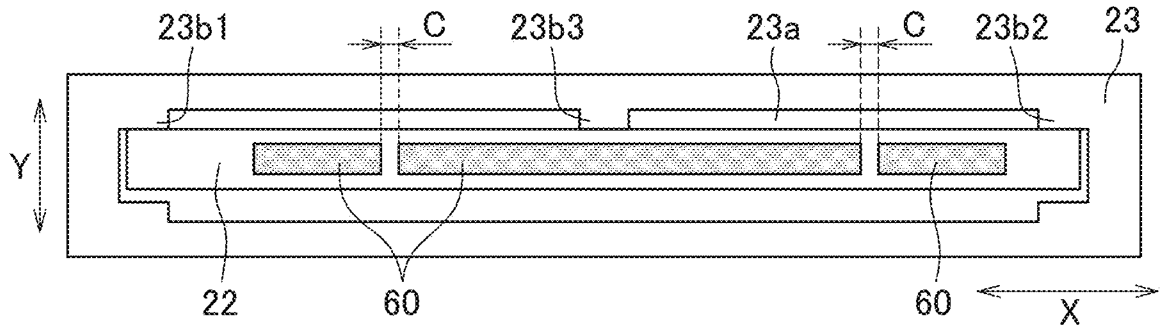
FIG. 20 is a plan view of a heater to illustrate a positioning configuration according to a fifth embodiment of the present disclosure.

On the contrary, the heater 22 including the plurality of resistive heat generators 60 arranged in the longitudinal direction may include the above-described positioning portion disposed at a position outside the separation area C in the longitudinal direction. FIG. 20 is a plan view of a heater 22 to illustrate a positioning configuration according to a fifth embodiment of the present disclosure. For example, the heater positioning portions **23*b*1, 23*b*2, and 23*b*3 are disposed outside the separation areas in the longitudinal direction as illustrated in FIG. 20. At the positions at which the heater positioning portions 23*b*1, 23*b*2, and 23*b*3 come into contact with the heater 22, heat transfers from the heater 22 to the heater holder 23, and the temperature of the heater 22 decreases. Accordingly, disposing each of the heater positioning portions 23*b*1, 23*b*2, and 23*b*3 at the position outside the separation area C having the small heat generation amount can form more uniform temperature distributions of the heater 22 and the fixing belt 20 than disposing each of the heater positioning portions 23*b*1, 23*b*2, and 23*b*3 at the position corresponding to the separation area C as illustrated in FIG. 19. In addition, not only the heater positioning portion 23*b* but also the holder positioning portion 23*c* may be disposed outside the separation area C in the longitudinal direction. At the position at which the holder positioning portion 23*c* contacts the heater holder 23, heat transfers from the heater holder 23 to the stay 24. In other words, the heat of the heater 22 is also easily taken by the heater holder 23 at this position in the longitudinal direction. Accordingly, disposing the holder positioning portion 23*c* at the position outside the separation area C can form more uniform temperature distributions of the heater holder 23, the heater 22, and the fixing belt 20** in the longitudinal direction.

The following describes a sixth embodiment. When the sheet P having a width different from the ranges of the central heating portion 65A and the end heating portion 65B passes through the fixing device 9 including the heater 22 as illustrated in FIG. 18, a part of the heat generation span of the heater 22 corresponds to the non-sheet conveyance span. In the non-sheet conveyance span, since heat does not transfer to the sheet P, the temperature of the heater 22 is likely to increase, and the thermal expansion of the heater 22 and the thermal expansion of the heater holder 23 that are in the non-sheet conveyance span are likely to be larger than those in a sheet conveyance span. Accordingly, disposing the positioning portion at a position outside the non-sheet conveyance span can accurately position the heater 22 and the like in the short-side direction.

Figure 21:
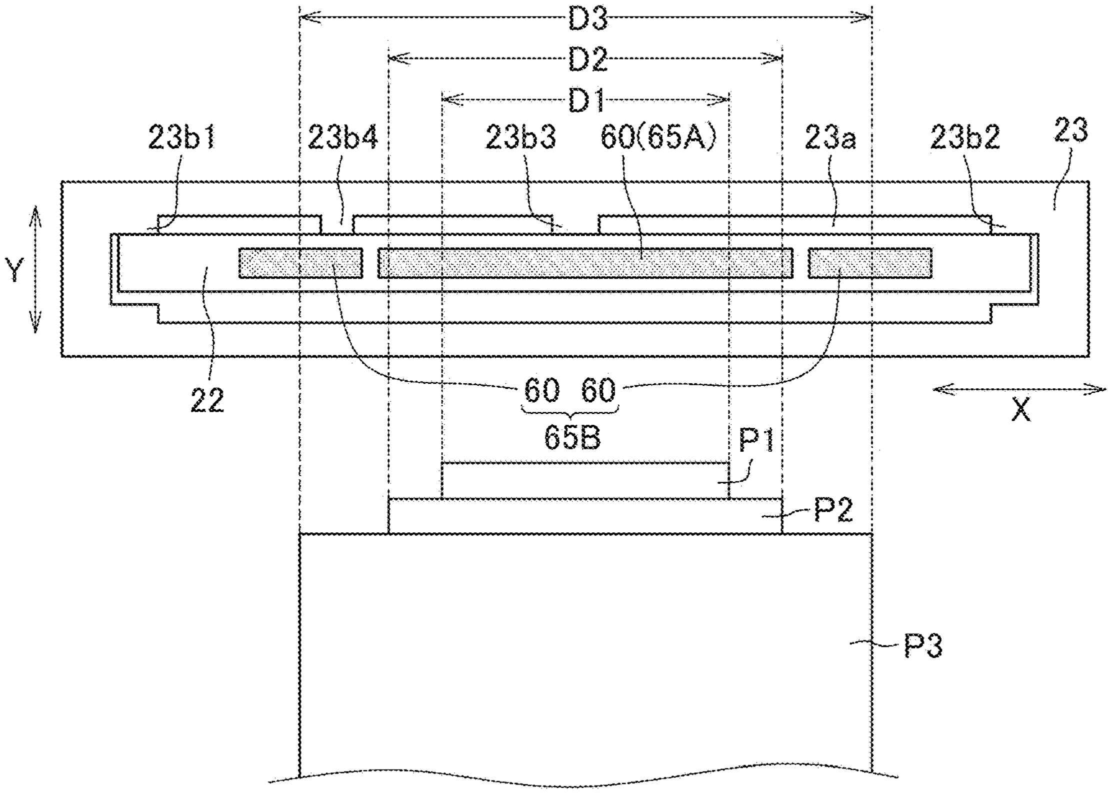
FIG. 21 is a plan view of a heater to illustrate a positioning configuration according to a sixth embodiment of the present disclosure.

For example, the heater 22 illustrated in FIG. 21 includes the central heating portion 65A having a length in the longitudinal direction corresponding to the width of the sheet P2 (for example, A4 sheet:210 mm). The third heater positioning portion **23*b*3 is disposed in the heater holder 23 to be within a sheet conveyance span D1 of the sheet P1 having the smallest width of sheets passing through the fixing device 9. As a result, the position of the third heater positioning portion 23*b*3 in the longitudinal direction is within the sheet conveyance span even when any sheet passes through the fixing device 9. The above-described configuration can position the heater 22 in a portion in which a thermal expansion is small and accurately position the heater 22** in the short-side direction.

Additionally, the heater holder 23 has a fourth heater positioning portion **23*b*4. The fourth heater positioning portion 23*b*4 is located outside a sheet conveyance span D2 of a sheet P2 (that is, outside the range of the central heating portion 65A) in the longitudinal direction and inside a sheet conveyance span D3 of a sheet P3 having one size larger width than the sheet P2 (for example, B4 sheet having the width of 257 mm). Accordingly, the fourth heater positioning portion 23*b*4 is within the sheet conveyance span when the end heating portion 65B generates heat. The above-described configuration can position the heater 22 in a portion in which a thermal expansion is small and accurately position the heater 22** in the short-side direction.

The holder positioning portion **23*c* may be configured like the third heater positioning portion 23*b*3 or the fourth heater positioning portion 23*b*4 that are illustrated in FIG. 21. The above-described configuration can accurately position the heater holder 23 in the short-side direction and, as a result, accurately position the heater 22** in the short-side direction.

Figure 22:
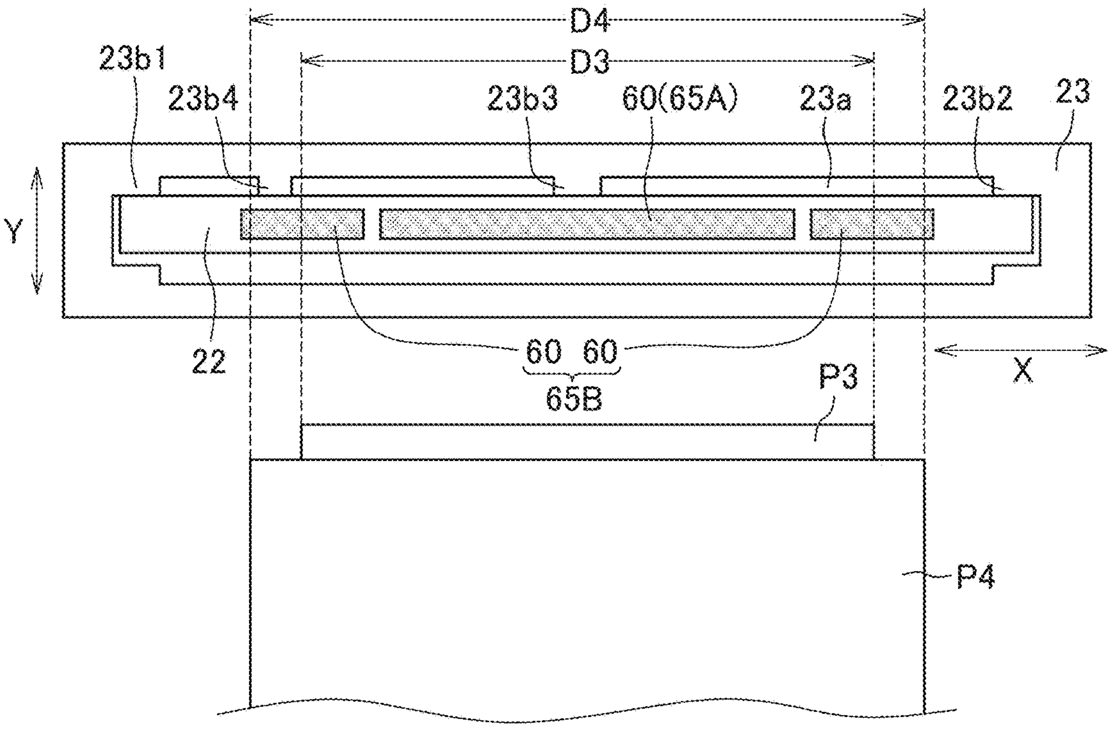
FIG. 22 is a plan view of a heater to illustrate a positioning configuration according to a seventh embodiment of the present disclosure.

The following describes a seventh embodiment. The positioning portion may be disposed at a position corresponding to the non-sheet conveyance span in the longitudinal direction. For example, the heat generation span in the longitudinal direction of the central heating portion 65A and the end heating portion 65B is set to be a width of 300 mm that is slightly larger than a width of the largest sheet P4 passing through the fixing device 9 (for example, a A3 sheet having a width of 297 mm) as illustrated in FIG. 22. The fourth heater positioning portion 23*b*4 is located inside a sheet conveyance span D4 of the sheet P4 and outside the sheet conveyance span D3 of the sheet P3 having one size smaller width than the sheet P4. That is, the fourth heater positioning portion 23*b*4 is disposed at a position corresponding to the non-sheet conveyance span when the sheet P4 passes through the fixing device 9. Thus, the heater holder 23 is in contact with the heater 22 in a region in which the temperature of the heater 22 is likely to rise. Accordingly, the above-described configuration can uniform the temperature distributions of the fixing belt 20 and the heater 22 in the longitudinal direction.

The holder positioning portion 23*c* may be disposed like the fourth heater positioning portion 23*b*4 illustrated in FIG. 22. The above-described configuration can accurately position the heater holder 23 in the short-side direction and uniform the temperature distributions of the heater holder 23, the heater 22, and the fixing belt 20 in the longitudinal direction.

Figure 23:
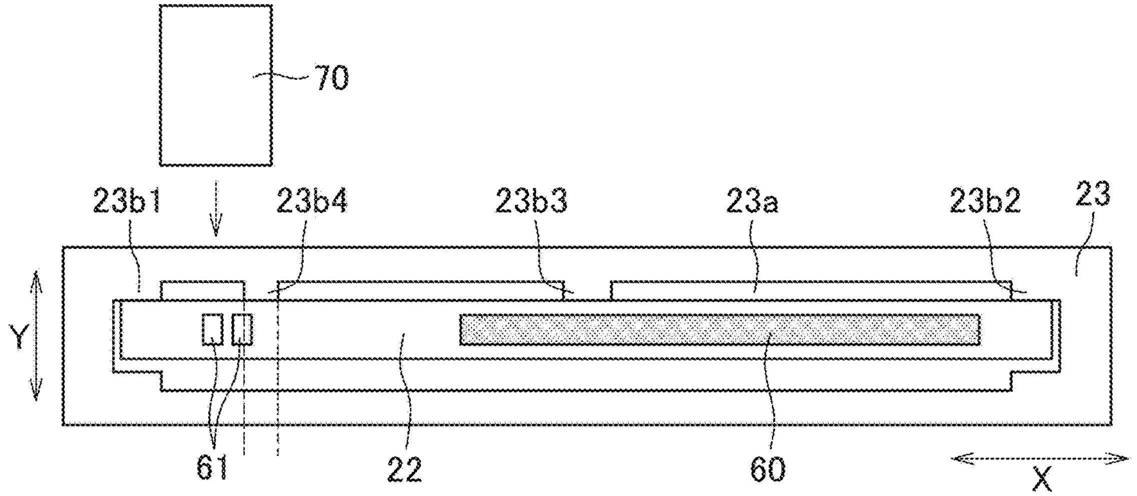
FIG. 23 is a plan view of a heater to illustrate a positioning configuration according to an eighth embodiment of the present disclosure.

The following describes an eighth embodiment. The heater positioning portion 23*b* may be disposed at a position corresponding to the electrode 61 of the heater 22. Specifically, the fourth heater positioning portion 23*b*4 is disposed at a position corresponding to the electrode 61 in the longitudinal direction as illustrated in FIG. 23. The above-described configuration can accurately position the heater 22 at the position corresponding to the electrode 61 in the short-side direction. As a result, the above-described configuration can improve the positional accuracy between the electrode 61 and the contact 72*a* (see FIG. 9) of the contact terminal 72 of the connector 70 and prevent a power supply failure due to the positional deviation between the electrode 61 and the contact 72*a*.

Figure 24:
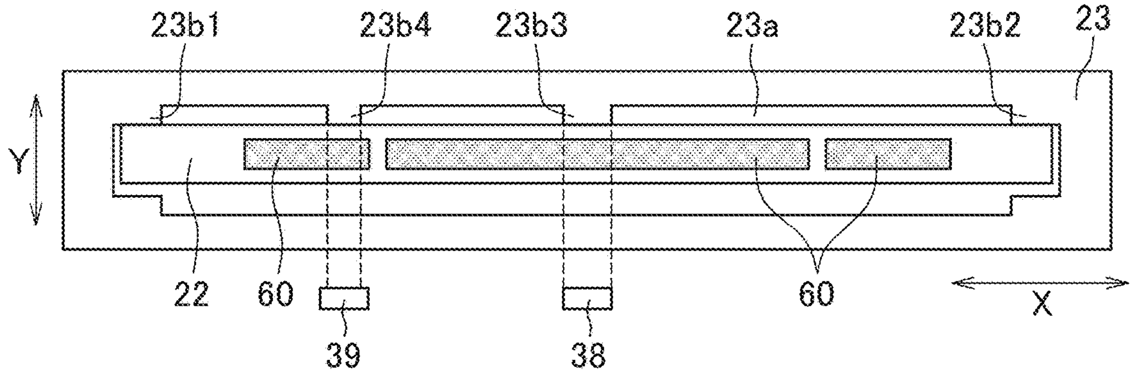
FIG. 24 is a plan view of a heater to illustrate a positioning configuration according to a ninth embodiment of the present disclosure.

The following describes a ninth embodiment. As illustrated in FIG. 24, a thermistor 38 and a thermostat 39 as temperature detector may be disposed at positions corresponding to the positioning portions 23*b* in the longitudinal direction. In the present embodiment, the thermistor 38 is disposed at the position corresponding to the third heater positioning portion 23*b*3 in the longitudinal direction, and the thermostat 39 is disposed at the position corresponding to the fourth heater positioning portions 23*b*4 in the longitudinal direction. However, the present disclosure is not limited this.

The thermostat 39 is a power cut-off component that detects an abnormal temperature rise of the heater 22 and cuts off power supply to the heater 22. When the temperature detected by the thermostat 39 exceeds a predetermined threshold value, power supply to the heater 22 is cut off.

Disposing the thermistor 38 at the position corresponding to the positioning portion 23*b* can improve the positional accuracy between the thermistor 38 and the heater 22, and disposing the thermostat 39 at the position corresponding to the positioning portion 23*b* can improve the positional accuracy between the thermostat 39 and the heater 22. As a result, the thermistor 38 or the thermostat 39 can more accurately detect the temperature of the heater 22.

Figure 25:
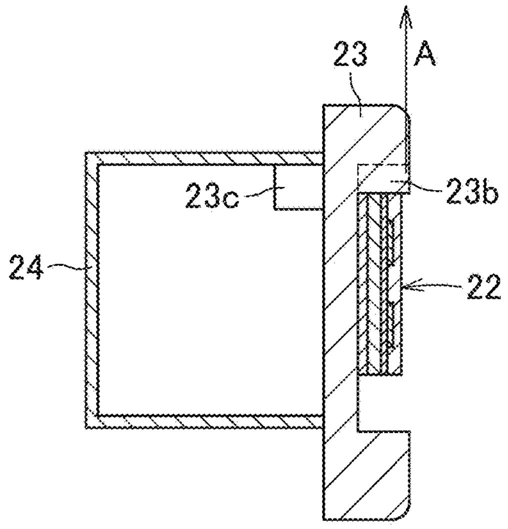
FIG. 25 is a side cross-sectional view of a heating unit to illustrate a positioning configuration according to a tenth embodiment of the present disclosure.

In the above, the holder positioning portion 23*c* is disposed upstream from the heater 22 in the sheet conveyance direction to position the heater holder 23 as illustrated in FIG. 12 but may be disposed downstream from the heater 22 in the sheet conveyance direction to position the heater holder 23. The following describes a tenth embodiment. For example, the heater holder 23 includes a holder positioning portion 23*c* as illustrated in FIG. 25. The holder positioning portion 23*c* is upstream from a downstream portion of the stay 24 (that is a downstream portion from the heater 22). In other words, the holder positioning portion 23*c* is under the downstream portion of the stay 24 in FIG. 25. The holder positioning portion abuts on the downstream portion of the stay 24. The above-described configuration positions the heater holder 23 with respect to the stay 24.

Abutting the heater 22 on the heater positioning portions 23*b* of the heater holder 23 as described above presses the heater holder 23 toward downstream in the sheet conveyance direction. Positioning the heater holder 23 with respect to the stay 24 at the position downstream from the heater 22 in the sheet conveyance direction can improve the positional accuracy of the heater 22 and the heater holder 23 in the short-side direction (that is the sheet conveyance direction).

Figure 26:
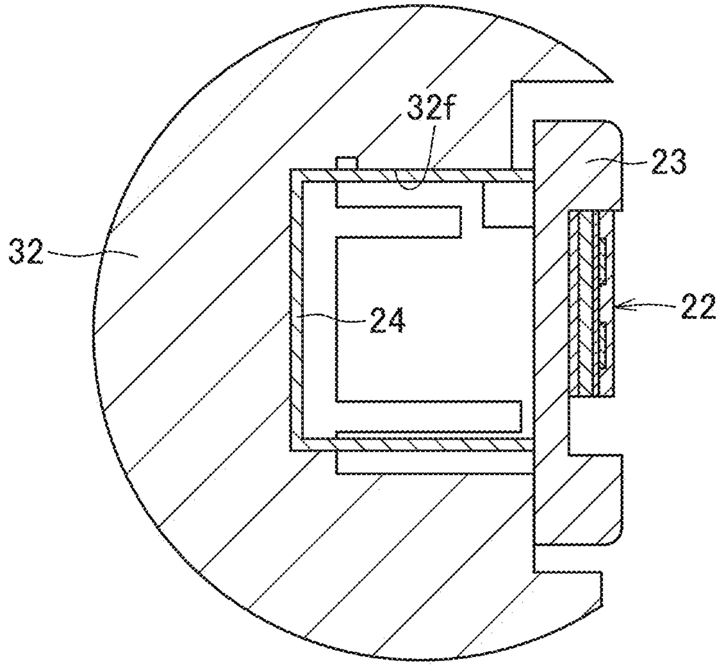
FIG. 26 is a side cross-sectional view of a heating unit to illustrate a positioning configuration according to an eleventh embodiment of the present disclosure.

The following describes an eleventh embodiment. As illustrated in FIG. 26, the flange 32 may include a stay positioning portion 32*f* as a support positioning portion on which the stay 24 abuts to position the stay 24 in the short-side direction. The stay positioning portion 32*f* has a flat surface. The stay positioning portion 32*f* is downstream from the heater 22 in the sheet conveyance direction and comes into contact with the stay 24 to position the stay 24. Since the above-described configuration positions the stay 24 at the position downstream from the heater 22 with respect to the flange 32, the above-described configuration can improve the positional accuracy of the stay 24, the heater holder 23, and the heater 22 in the short-side direction.

Figure 27:
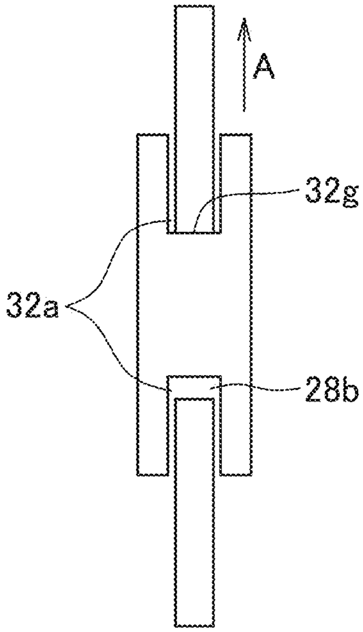
FIG. 27 is a schematic diagram illustrating a positioning configuration according to a twelfth embodiment of the present invention.

The following describes a twelfth embodiment. As illustrated in FIG. 4, the flange 32 has the guide grooves 32*a* into which edges of the insertion slot 28*b* of the side wall 28 enter. As illustrated in FIG. 27, abutting a bottom surface 32*g* of the guide groove 32*a* downstream in the sheet conveyance direction on the edge of the insertion slot 28*b* positions the flange 32 in the short-side direction with respect to the side wall 28. The contact position at which the bottom surface 32*g* contacts the edge of the insertion slot 28*b* is downstream from the heater 22 in the sheet conveyance direction. The above-described configuration can improve the positional accuracy of the flange 32, the heater holder 23, and the heater 22 in the short-side direction.

The above-described embodiments are illustrative and do not limit this disclosure. It is therefore to be understood that within the scope of the appended claims, numerous additional modifications and variations are possible to this disclosure otherwise than as specifically described herein.

The image forming apparatus according to the present embodiments of the present disclosure is applicable not only to a color image forming apparatus 100 illustrated in FIG. 1 but also to a monochrome image forming apparatus, a copier, a printer, a facsimile machine, or a multifunction peripheral including at least two functions of the copier, printer, and facsimile machine.

The sheets P serving as recording media may be thick paper, postcards, envelopes, plain paper, thin paper, coated paper, art paper, tracing paper, overhead projector (OHP) transparencies, plastic film, prepreg, copper foil, and the like.

The above-described fixing device 9 includes the heater 22 that functions as the nip formation pad, but the present disclosure is not limited to the above-described fixing device as the heating device. The fixing device may include the heater and the nip formation pad that are different members.

Figure 28:
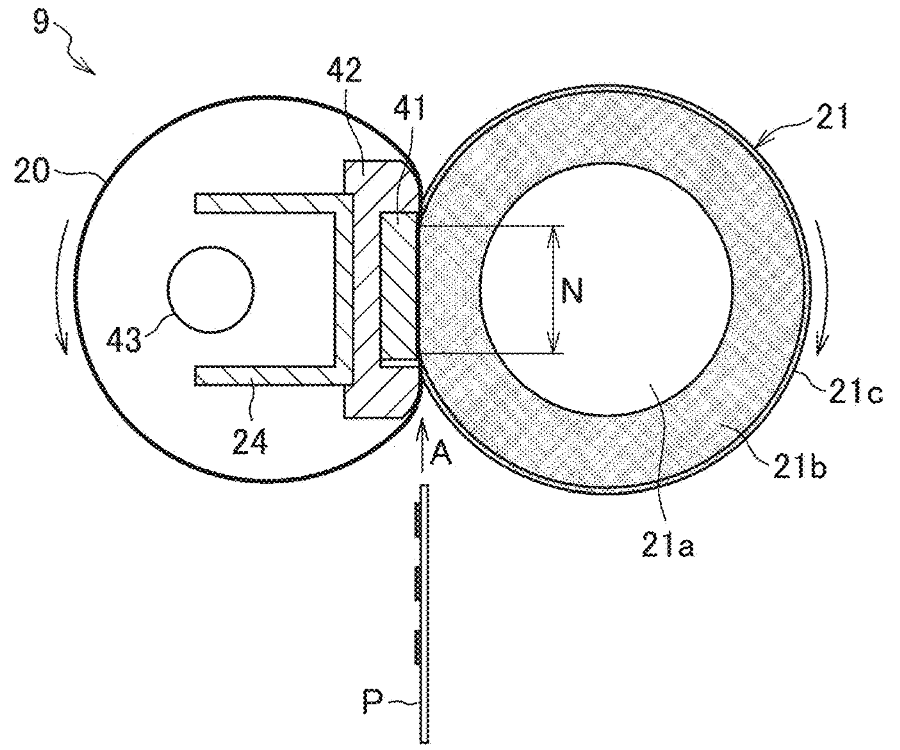
FIG. 28 is a schematic cross-sectional view of a main part of a fixing device different from the fixing device illustrated in FIG. 2.

For example, as illustrated in FIG. 28, the fixing device 9 according to the present embodiment includes a halogen heater 43 in addition to the nip formation pad 41 that contacts the inner surface of the fixing belt 20. The fixing device 9 includes a fixing pad 42 serving as a holder. The fixing device 9 may include a reflector between the halogen heater 43 and the stay 24.

The nip formation pad 41 forms a fixing nip N between the pressure roller 21 and the fixing belt 20.

The nip formation pad 41 also functions as a heat equalizing plate that equalizes the temperature of the fixing belt 20 in the longitudinal direction. The nip formation pad 41 is made of material having a thermal conductivity higher than that of the fixing pad 42. The material of the nip formation pad 41 may be aluminum, steel use stainless (SUS), or copper-based material.

Next, a method of calculating the thermal conductivity is described. In order to calculate the thermal conductivity, the thermal diffusivity of a target object is firstly measured. Using the thermal diffusivity, the thermal conductivity is calculated.

The thermal diffusivity is measured using a thermal diffusivity/conductivity measuring device (TM: ai-Phase Mobile 1 u, manufactured by Ai-Phase co., ltd.).

In order to convert the thermal diffusivity into thermal conductivity, values of density and specific heat capacity are necessary.

The density is measured by a dry automatic densitometer (TM: Accupyc 1330 manufactured by Shimadzu Corporation).

The specific heat capacity is measured by a differential scanning calorimeter (TM: DSC-60 manufactured by Shimadzu Corporation), and sapphire is used as a reference material in which the specific heat capacity is known. In the present embodiment, the specific heat capacity is measured five times, and an average value at 50° C. is used. The thermal conductivity λ is obtained by the following expression (1).

$$\lambda=\rho\times C\times\alpha \quad (1)$$

where ρ is the density, C is the specific heat capacity, and α is the thermal diffusivity obtained by the thermal diffusivity measurement described above.

The fixing pad 42 holds the nip formation pad 41. The stay 24 supports the back side of the fixing pad 42 (the side opposite to the fixing nip N).

The halogen heater 43 heats the inner surface of the fixing belt 20 by radiant heat. The halogen heater 43 includes a filament having a densely wound portion and a loosely wound portion in the longitudinal direction of the filament. In the densely wound portion, the filament is densely wound. The heat generation span M (see FIG. 7) in the halogen heater 43 is a main heat generation span in the halogen heater 43. The heat generation span includes the entire densely wound portion (and portions between a plurality of densely wound portions when the filament includes the plurality of densely wound portions disposed in the longitudinal direction).

The fixing belt 20 is driven and rotated in a direction indicated by arrow in FIG. 28 by the pressure roller 21 as the pressure roller 21 rotates. Similar to the heater 22 and the heater holder 23 as described above, the nip formation pad 41 and the fixing pad 42 are bent by receiving the frictional force in the rotation direction of the fixing belt 20. Accordingly, disposing the above-described positioning portions in the fixing pad 42 prevents deformation of the nip formation pad 41 and deformation of the fixing pad 42. Specifically, a pad positioning portion is disposed in the fixing pad 42 to position the nip formation pad 41 with respect to the fixing pad 42. In addition, a holder positioning portion is disposed in the fixing pad 42 to position the fixing pad 42 with respect to the stay 24. The above-described configuration can prevent the deformation of the nip formation pad 41 caused by the friction force of the fixing belt 20 and the deformation of the fixing pad 42.

Figure 29:
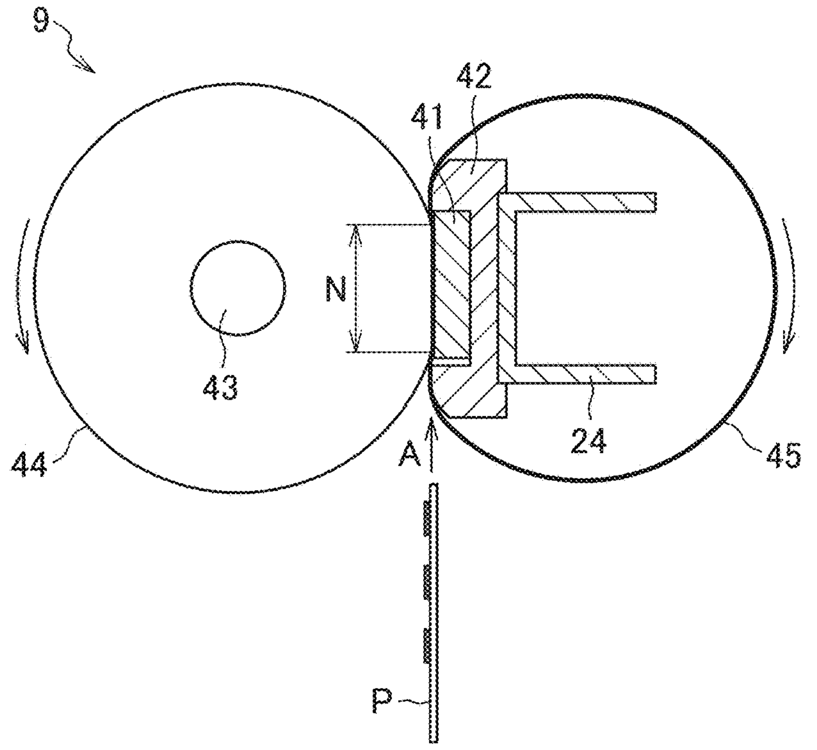
FIG. 29 is a schematic cross-sectional view of a main part of a fixing device different from the fixing device illustrated in FIG. 2.

The fixing device 9 illustrated in FIG. 29 includes a fixing roller 44 and a pressure belt 45 instead of the fixing belt 20 and the pressure roller 21. A halogen heater 43 is disposed inside the fixing roller 44. A nip formation pad 41, a fixing pad 42, a stay 24, and the like are disposed inside the pressure belt 45.

The halogen heater 43 heats the fixing roller 44 from the inside thereof. The nip formation pad 41 forms a fixing nip N between the fixing roller 44 and the pressure belt 45. The fixing pad 42 holds the nip formation pad 41. The stay 24 supports the back side of the fixing pad 42 (the side opposite to the fixing nip N).

Also in this embodiment, when the pressure belt 45 is rotated in a direction indicated by arrow in FIG. 29, a friction force of the pressure belt 45 in the rotation direction deforms the nip formation pad 41 and the fixing pad 42. Accordingly, the above-described configuration of the positioning portions may be applied to the nip formation pad 41. The above-described configuration of the positioning portions can prevent the deformation of the nip formation pad 41 due to the frictional force of the pressure belt 45 and thus prevent the deformation of the fixing pad 42.

A heating device according to the present disclosure is not limited to the fixing device described in the above embodiments. The heating device according to the present disclosure is also applicable to, for example, a heating device such as a dryer to dry ink applied to the sheet, a coating device (a laminator) that heats, under pressure, a film serving as a covering member onto the surface of the sheet such as paper, and a thermocompression device such as a heat sealer that seals a seal portion of a packaging material with heat and pressure. Accordingly, deformation of the holder and the nip formation pad (or the heating member) can be prevented.

In the above description, the pad positioning portion is disposed in the nip formation pad (the heater 22 or the nip formation pad 41) to position the nip formation pad with respect to the holder, but the present disclosure is not limited to this. The pad positioning portion may be disposed in the nip formation pad. For example, the heater 22 in the embodiment illustrated in FIG. 12(*a*) may have a heater positioning portion from a part of a downstream side of the base 50 of the heater 22 in the short-side direction that is the part of the downstream side in the longitudinal direction toward the heater holder 23 (toward the upper side in FIG. 12(*a*))

In the above-described embodiments, the holder positioning portion is disposed in the holder (that is the heater holder 23 or the fixing pad 42) to position the holder with respect to the stay 24 but may be disposed in the stay 24.

In the above-described embodiments, for example, the left side of FIG. 7 is set as one side in the longitudinal direction, and the right side of FIG. 7 is set as the other side in the longitudinal direction, but this may be reversed.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

What is claimed is:

1. A heating device comprising:

a belt;

an opposed rotator opposite the belt;

a heater;

a nip formation pad inside a loop of the belt and configured to form a nip between the belt and the opposed rotator;

a holder configured to hold the nip formation pad;

a stay configured to support the holder;

first to third pad positioning portions on at least one of the nip formation pad or the holder and configured to position the nip formation pad with respect to the holder in a rotation direction of the belt, the first pad positioning portion at a first end of the at least one of the nip formation pad or the holder with respect to a center position of a heat generation span of the heater in a longitudinal direction of the heater;

the second pad positioning portion at a second end of the at least one of the nip formation pad or the holder with respect to the center position of the heat generation span of the heater in the longitudinal direction of the heater;

the third pad positioning portion closer to the center position of the heat generation span of the heater in the longitudinal direction of the heater than each of the first pad positioning portion and the second pad positioning portion, wherein no additional pad positioning portions are positioned between the first pad positioning portion and the third pad positioning portion, and no additional pad positioning portions are positioned between the second pad positioning portion and the third pad positioning portion; and a holder positioning portion included by at least one of the holder or the stay and configured to position the holder with respect to the stay in the rotation direction of the belt, the holder positioning portion closer to the center position than at least one of the first pad positioning portion or the second pad positioning portion.

2. The heating device according to claim 1, further comprising:

a plurality of holder positioning portions including the holder positioning portion, the plurality of holder positioning portions including:

at least one holder positioning portion at the first end of the at least one of the holder or the stay with respect to the center position in the longitudinal direction, the at least one holder positioning portion closer to the center position than the first pad positioning portion; and at least another one holder positioning portion at the second end of the at least one of the holder or the stay with respect to the center position in the longitudinal direction, the at least another one holder positioning portion closer to the center position than the second pad positioning portion.

3. The heating device according to claim 1, wherein at least a part of the third pad positioning portion is within a conveyance span of a recording medium having the smallest width in the longitudinal direction of recording media used in the heating device.

4. The heating device according to claim 1, wherein the third pad positioning portion is at a position of the at least one of the nip formation pad or the holder, the position being the same as the center position in the longitudinal direction.

5. The heating device according to claim 1, wherein the holder positioning portion is at a position of the at least one of the holder or the stay, the position being the same as the center position in the longitudinal direction.

6. The heating device according to claim 1, wherein at least one of the first to third pad positioning portions overlaps the holder positioning portion in the longitudinal direction.

7. The heating device according to claim 1, wherein the heater and the nip formation pad are configured as a single component.

8. The heating device according to claim 7, wherein the heater includes a plurality of heat generators arranged in the longitudinal direction; and at least one of the first to third pad positioning portions or the holder positioning portion is at a position corresponding to a separation area between the heat generators in the longitudinal direction.

9. The heating device according to claim 7, wherein the heater includes a plurality of heat generators arranged in the longitudinal direction; and at least one of the first to third pad positioning portions or the holder positioning portion is at a position outside a separation area between the heat generators in the longitudinal direction.

10. The heating device according to claim 7, wherein the heater includes a plurality of heat generators, the plurality of heat generators including a central heating portion and an end heating portion that are each configured to independently generate heat;

the central heating portion is closer to the center position in the longitudinal direction than the end heating portion; and at least one of the first to third pad positioning portions or the holder positioning portion is at a position outside the central heating portion in the longitudinal direction, and the position of the at least one of the first to third pad positioning portions or the holder positioning portion is inside a conveyance span, in the longitudinal direction, of a first recording medium being one recording media size wider than a second recording medium having a smaller width than the central heating portion, the first recording medium being capable of being used in the heating device.

11. The heating device according to claim 7, wherein the heater includes a plurality of heat generators, the plurality of heat generators including a central heating portion and an end heating portion that are each configured to independently generate heat;

the central heating portion is closer to the center position in the longitudinal direction than the end heating portion; and at least one of the first to third pad positioning portions or the holder positioning portion is at a position inside a conveyance span, in the longitudinal direction, of a first recording medium, the first recording medium having a largest width of recording media capable of being used in the heating device, and the position of the at least one of the first to third pad positioning portions or the holder positioning portion is outside a conveyance span, in the longitudinal direction, of a second recording medium, the second recording medium being one recording media size smaller width than the first recording medium.

12. The heating device according to claim 7, wherein the heater includes a plurality of heat generators and a plurality of electrodes;

the plurality of electrodes are in contact with a connector, and the plurality of electrodes are configured to supply power to the plurality of heat generators; and at least one of the pad positioning portions is at a position corresponding to the plurality of electrodes in the longitudinal direction.

13. The heating device according to claim 7, further comprising:

a temperature detector, wherein at least one of the first to third pad positioning portions is at a position corresponding to the temperature detector.

14. The heating device according to claim 7, wherein the holder is made of resin, and the stay is made of material having a higher rigidity than the resin of the holder.

15. The heating device according to claim 1, wherein at least one of the first to third pad positioning portions or the holder positioning portion is at a position downstream from the nip formation pad in the rotation direction of the belt.

16. The heating device according to claim 1, wherein a width of at least one of the first to third pad positioning portions in the longitudinal direction is larger than a width of the holder positioning portion in the longitudinal direction.

17. The heating device according to claim 1, wherein a width of at least one of the first to third positioning portions in the longitudinal direction is smaller than a width of the holder positioning portion in the longitudinal direction.

18. A fixing device comprising:

the heating device according to claim 1.

19. An image forming apparatus comprising:

the heating device according to claim 1.

* * * * *